United States Patent [19]
Nunally et al.

[11] Patent Number: 6,035,341
[45] Date of Patent: Mar. 7, 2000

[54] MULTIMEDIA DATA ANALYSIS IN INTELLIGENT VIDEO INFORMATION MANAGEMENT SYSTEM

[75] Inventors: Patrick O. Nunally, Delmar; David Ross MacCormack, San Diego, both of Calif.

[73] Assignee: Sensormatic Electronics Corporation, Boca Raton, Fla.

[21] Appl. No.: 09/069,508

[22] Filed: Apr. 29, 1998

Related U.S. Application Data

[63] Continuation-in-part of application No. 08/742,017, Oct. 31, 1996, and a continuation-in-part of application No. 08/741,982, Oct. 31, 1996, Pat. No. 5,875,305.

[51] Int. Cl.$^7$ ........................................... H04N 9/79
[52] U.S. Cl. ............................... 709/253; 709/266
[58] Field of Search .......................... 709/261, 266, 709/247

[56] References Cited

U.S. PATENT DOCUMENTS

| | | | |
|---|---|---|---|
| 4,081,830 | 3/1978 | Mick et al. ............................. | 358/105 |
| 4,249,207 | 2/1981 | Harman et al. ......................... | 358/108 |
| 4,737,847 | 4/1988 | Araki et al. ............................ | 358/108 |
| 4,857,912 | 8/1989 | Everett, Jr. et al. ................. | 340/825.3 |
| 5,666,157 | 9/1997 | Aviv ....................................... | 348/152 |
| 5,909,511 | 6/1999 | Yoshimoto ............................. | 382/236 |
| 5,909,548 | 6/1999 | Klein et al. ........................ | 340/825.06 |
| 5,917,958 | 6/1999 | Nunally et al. ........................ | 382/276 |
| 5,933,534 | 8/1999 | Yoshimoto et al. .................... | 382/236 |

*Primary Examiner*—Thomas R. Peeso
*Attorney, Agent, or Firm*—Robin, Blecker & Daley

[57] ABSTRACT

A flexible multimedia information analysis apparatus stores a database which includes both audio and video information. Also stored are a plurality of content analysis algorithms for analyzing the audio information in the database. A user can manipulate a mouse to select one of the analysis algorithms. The selected algorithm is used to analyze audio information in the database or on a "live" basis as the audio information is received. Audio analysis algorithms can be applied in tandem with moving image content analysis algorithms applied to stored video data or live input video streams.

59 Claims, 24 Drawing Sheets

VR/PC

FIG. 5
MULTIMEDIA DATA FORMAT ON DISK
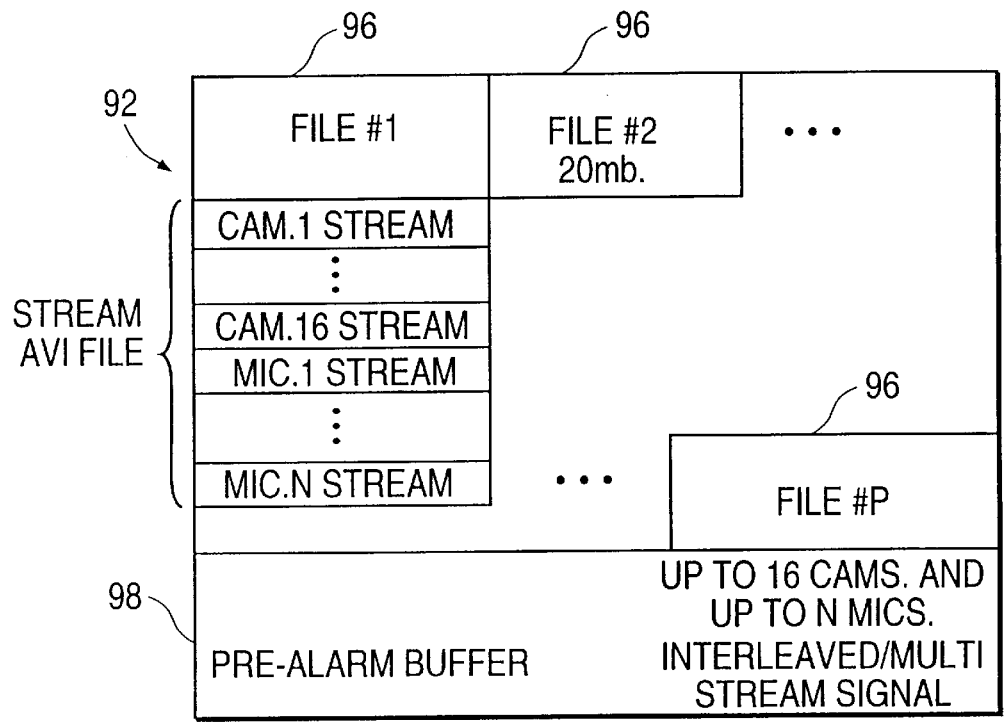
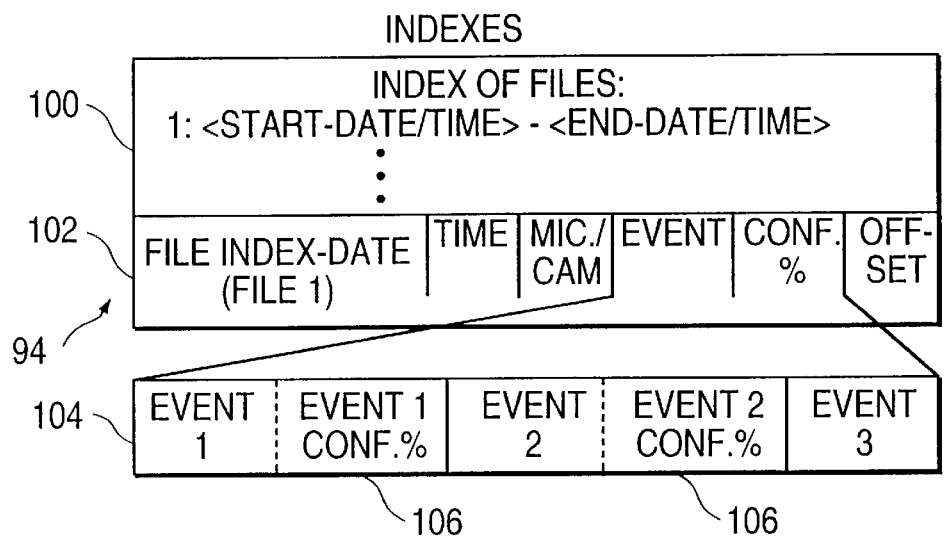

AUDIO SEARCH

PERFORM SEARCH

SELECT & SETUP ANALYSIS TOOL

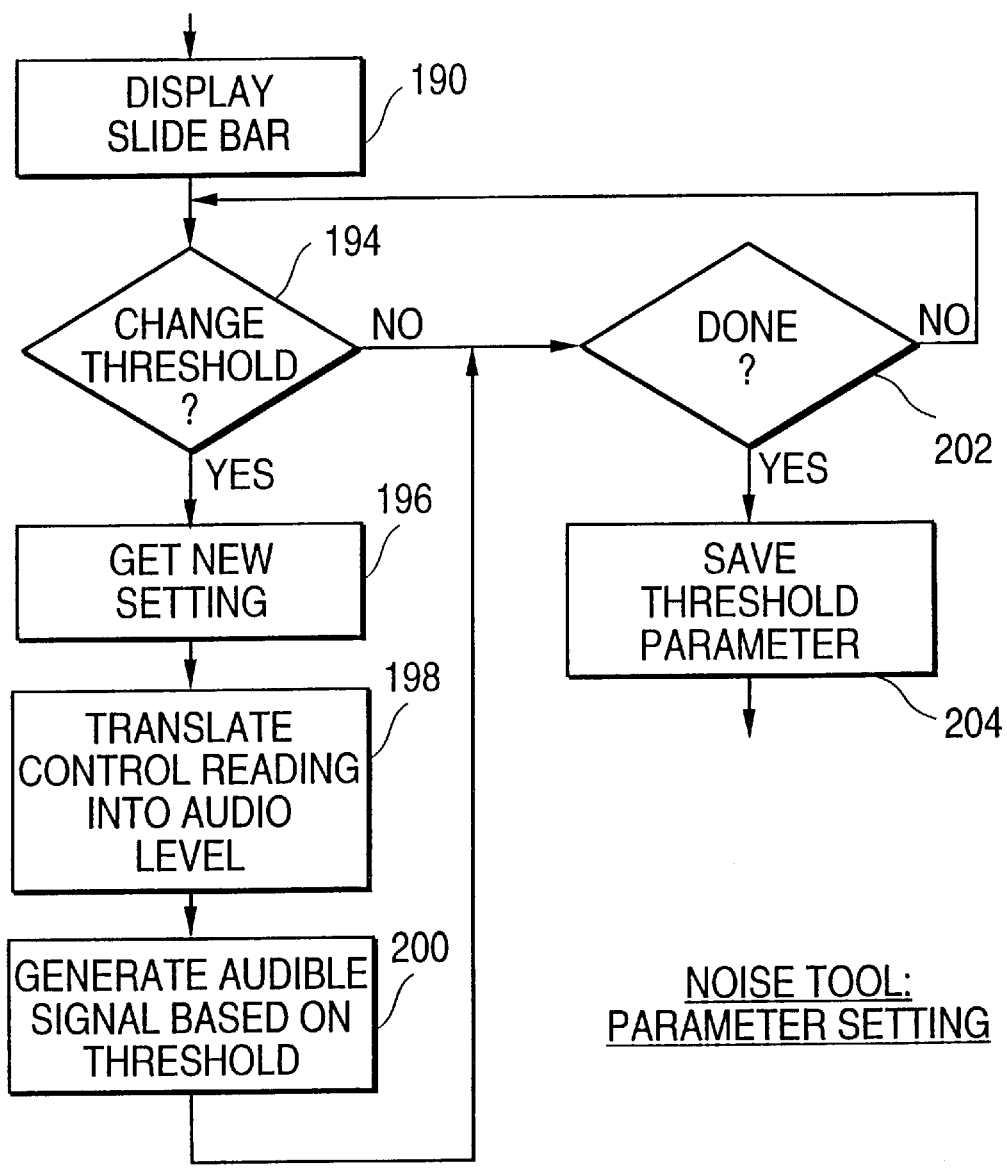

PARAMETER SETTING
FOR FREQUENCY BASED TOOL

AUDIO ANALYSIS
(NOISE TOOL)

AUDIO ANALYSIS
(GENERIC FREQUENCY TOOL)

SELECTING
AUDIO TOOLS
FOR SEARCH

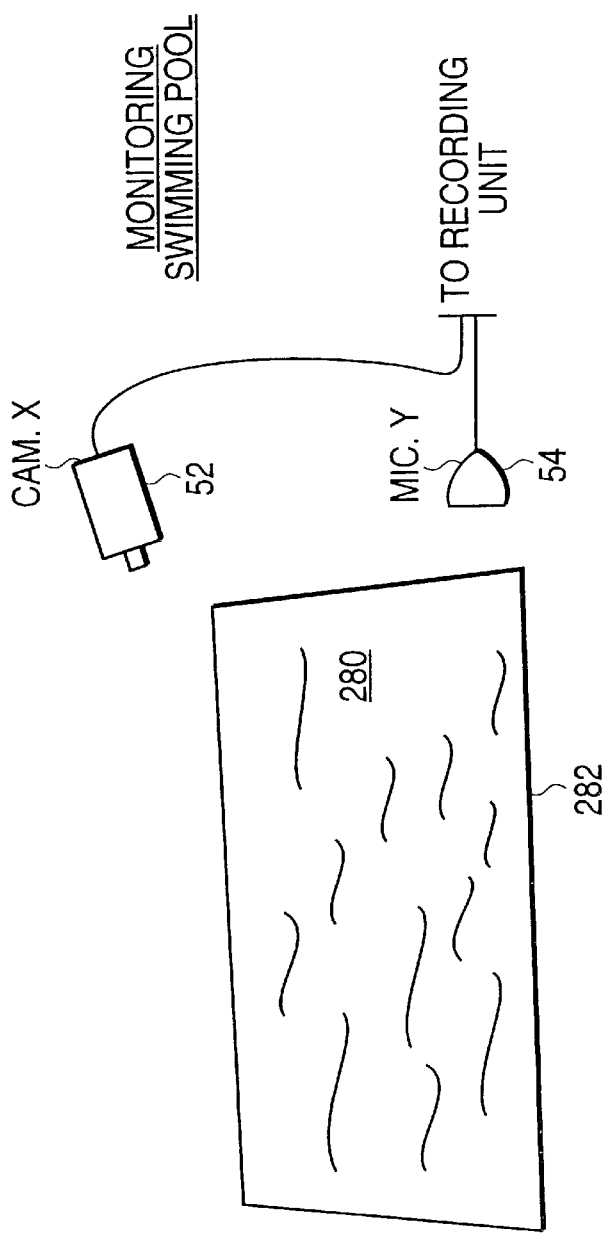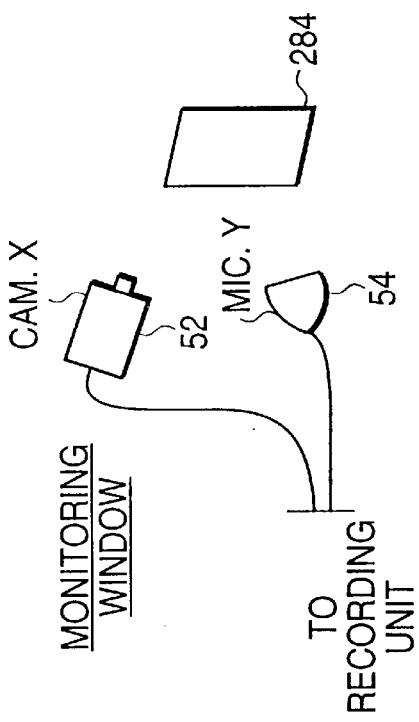

MULTIMEDIA DATA ANALYSIS IN INTELLIGENT VIDEO INFORMATION MANAGEMENT SYSTEM

CROSS-REFERENCE TO RELATED APPLICATIONS

This application is a continuation-in-part of prior applications Ser. Nos. 08/742,017 and 08/741,982, now U.S. Pat. No. 5,875,305 both filed Oct. 31, 1996. The disclosures of these two prior applications are incorporated herein by reference. Also to be noted is another related application, Ser. No. 08/729,620, also filed Oct. 31, 1996 (for which the issue fee has been paid), now U.S. Pat. No. 5,822,542.

BACKGROUND OF THE INVENTION

In the above-referenced parent patent applications, a digital video recorder was disclosed which has intelligent video information management capabilities. According to one notable feature of the disclosed recorder, the recorder stores program software corresponding to a number of different image content analysis algorithms which allow the recorder to detect predetermined features of video image streams. The image content analysis algorithms, which may also be referred to as "filters" or "tools", are selectable by a user of the recorder and can be applied either to a video signal stream or streams arriving as an input for the recorder ("live analysis") or can be used to aid in detecting features in a video data stream that has previously been stored in the recorder ("tool-based searching").

OBJECTS AND SUMMARY OF THE INVENTION

It is an object of the invention to apply the concepts of live analysis and tool-based searching to audio signal streams.

It is a further object of the invention to provide an integrated video and audio recording device with advanced information management capabilities.

According to a first aspect of the invention, there is provided a flexible multimedia information analysis apparatus, including a first storage capability for storing a multimedia information database, the database including image data and sound data; a second storage capability for storing a plurality of sound data content analysis algorithms for analyzing sound data in the database; a user-actuatable mechanism for selecting one of the algorithms; and an analysis circuit, responsive to the user-actuatable mechanism, for analyzing the sound data in the database in accordance with the one of the algorithms selected by the user-actuatable mechanism. The apparatus according to this aspect of the invention may further include a plurality of microphones for generating respective sequences of analog sound signals, and circuitry for digitizing the respective sequences of analog sound signals generated by the microphones and for supplying the digitized sequences of sound signals to the first storage capability. The apparatus may further include a display device for displaying a plurality of icons or alphanumeric labels, each of which represents a respective one of the algorithms for analyzing sound data, and the user-actuatable mechanism may include a mouse or other display-interfaced mechanism for selecting one of the displayed icons or alphanumeric labels. Respective ones of the stored algorithms may operate to detect an amplitude level of the sound data analyzed by the algorithm or a frequency characteristic of the sound data analyzed by the algorithm.

According to a second aspect of the invention, there is provided a method of storing and retrieving audio data, including the steps of storing data representing sound signals generated over a period of time, selecting a search algorithm to be used in searching for a desired sound segment represented by the stored data, setting a parameter for constraining execution of the selected search algorithm, and searching the stored data in accordance with the selected search algorithm and the set parameter. The parameter to be set may represent a sound amplitude level or a sound frequency characteristic.

According to a third aspect of the invention, there is provided a flexible multimedia information analysis apparatus, including an audio information source for providing audio information which represents at least one sequence of sound signals; a storage device for storing a plurality of algorithms for analyzing the audio information provided by the audio information source; a user-actuatable mechanism for selecting one of the algorithms; and analysis circuitry responsive to the user actuatable mechanism, for receiving the audio information provided by the audio information source and for analyzing the received audio information provided by the audio information source in accordance with one of the algorithms selected by the user-actuatable mechanism. The audio information source may include one or more microphones for generating a respective sequence or sequences of sound signals, and analog/digital conversion means for converting the sound signals to digital audio data.

According to a fourth aspect of the invention, there is provided a method of analyzing multimedia information, including the steps of receiving an analog video signal which represents a dynamic sequence of images, digitizing the received analog video signal to form a sequence of video data frames which represent the dynamic sequence of images, first analyzing the sequence of video data frames using a predetermined video data analysis algorithm and generating first analysis data indicative of results of the first analyzing, storing the sequence of video data frames in a database, storing the first analysis data in the database in association with the stored sequence of video data frames; and, simultaneously with the foregoing steps, receiving an analog audio signal which represents a sequence of audible sounds, digitizing the received analog audio signal to form a sequence of audio data which represents the audible sounds, second analyzing the sequence of audio data using a predetermined audio data analysis algorithm and generating second analysis data indicative of results of the second analyzing, storing the sequence of audio data in the database, and storing the second analysis data in the database in association with the stored sequence of audio data.

It is to be understood, for the purposes of the present disclosure and the appended claims, that "video data frames" and "video signal frames" include "video data fields" and "video signal fields", and vice versa.

According to a fifth aspect of the invention, there is provided an apparatus for analyzing video and audio information, including a first receiving circuit for receiving an analog video signal which represents a dynamic sequence of images; a first analog/digital conversion circuit, connected to the first receiving circuit, for digitizing the analog video signal to form a sequence of video data frames which represent the dynamic sequence of images; a first analysis circuit, connected to the first analog/digital conversion circuit, for analyzing the sequence of video data frames using a predetermined video data analysis algorithm to generate first analysis data; a storage device, connected to the first analog/digital conversion circuit and the first analysis circuit, for storing the sequence of video data frames formed by the first analog/digital conversion circuit and the first analysis data generated by the first analysis circuit; a second receiving circuit for receiving an analog audio signal which represents a sequence of audible sounds; a second analog/digital conversion circuit, connected between the second receiving circuit and the storage device, for digitizing the analog audio signal to form a sequence of audio data which represents the audible sounds, the sequence of audio data formed by the second analog/digital conversion circuit being stored in the storage device; and a second analysis circuit, connected between the second analog/digital conversion circuit and the storage device, for analyzing the sequence of audio data using a predetermined audio data analysis algorithm to generate second analysis data, which is stored in the storage device.

According to a sixth aspect of the invention, there is provided an apparatus for analyzing multimedia information as the information is received, the apparatus including at least one video camera for generating a sequence of video signals; at least one microphone for generating a sequence of audio signals; conversion circuitry, connected to the at least one video camera and the at least one microphone, for converting the video signals and the audio signals into video data and audio data, respectively; and an analysis circuit, connected to the conversion circuit, for applying at least one video information analysis algorithm to the video data, and for applying at least one audio information analysis algorithm to the audio data.

According to a seventh aspect of the invention, there is provided an audio information analysis apparatus, including circuitry for receiving audio information; an analysis circuit for analyzing the received audio information in accordance with a predetermined analysis algorithm; and a parameter setting device, actuatable by a user of the apparatus, for setting a parameter to constrain execution of the analysis algorithm, the analysis circuit being responsive to the parameter setting device so as to execute the analysis algorithm in accordance with the parameter set by the parameter setting device.

According to an eighth aspect of the invention, there is provided a method of searching a multimedia information database, including the steps of storing a plurality of algorithms for identifying respective features represented by audio information in the database, selecting two of the stored algorithms for respectively identifying a first feature and a second feature, selecting a logical operator to form a logical combination of the two selected algorithms, and searching the database to identify audio data sequences which satisfy the logical combination of the two selected algorithms.

According to a ninth aspect of the invention, there is provided a method of analyzing multimedia data, the method including the steps of simultaneously receiving a stream of video data and a stream of audio data, and, simultaneously with the previous steps, applying a first analysis algorithm to the received stream of video data to determine whether a first feature is present in the stream of video data, and simultaneously with the previous steps, applying a second analysis algorithm to the received stream of audio data to determine whether a second feature is present in the stream of audio data, and, if it is determined that the first feature is present in the stream of video data at a time when the second feature is determined to be present in the stream of audio data, generating an alarm signal. Particular applications of this aspect of the invention may include using both video and audio monitoring to detect the breaking of a window, or to detect a splash in a swimming pool.

According to a tenth aspect of the invention, there is provided a video surveillance system, including a video camera for generating a stream of video signals; a storage device, connected to the video camera, for selectively storing the stream of video signals; a microphone for generating a stream of analog audio signals; an analog/digital conversion circuit, connected to the microphone, for converting the stream of analog audio signals into a sequence of audio data signals; and an analysis circuit for receiving the sequence of audio data signals and applying a selected audio information analysis algorithm to the sequence of audio data signals to detect a predetermined feature of the stream of analog audio signals; the system being operable in a mode such that the storage device is responsive to the analysis circuit so as to store the stream of video signals only at times when the analysis circuit detects the predetermined feature of the stream of analog audio signals.

According to an eleventh aspect of the invention, there is provided an apparatus for analyzing audio information, including a microphone for generating a stream of analog audio signals; an analog/digital conversion circuit, connected to the microphone, for converting the stream of analog signals into a sequence of audio data signals; and analysis circuitry (a) for receiving the sequence of audio data signals formed by the analog/digital conversion circuit and for performing a first audio information content analysis algorithm with respect to the received sequence of audio data signals, and (b) also for performing a second audio information content analysis algorithm, different from the first algorithm, with respect to the received sequence of audio data signals.

According to a twelfth aspect of the invention, there is provided a video information storage apparatus, including circuitry for receiving a television broadcast signal, including a video component and an audio component; a storage device, connected to the receiving circuitry, for selectively storing the received television broadcast signal in digital form; and monitoring circuitry for analyzing content of the audio component of the television broadcast signal, the storage device being responsive to the monitoring circuitry such that the storage device stores the television broadcast signal only when the monitoring circuitry detects a predetermined characteristic of the audio component of the television broadcast signal. The receiving circuitry may include a tuner connected to an antenna for receiving an off-air broadcast signal or a conventional set-top box used in a cable television system. The television broadcast signal may represent a sporting event, and the predetermined characteristic (which is to be detected) of the audio component of the television broadcast signal may be an increase in an audience noise component of the audio component of the broadcast signal. The television broadcast signal may also include a closed-captioning component which is to be monitored by monitoring circuitry, to trigger the storage device to store the broadcast television signal only when a predetermined character string in the closed-captioning component is detected.

Additional features and aspects of the invention will become apparent from the accompanying drawings and the following detailed description of preferred embodiments.

BRIEF DESCRIPTION OF THE DRAWINGS

FIG. 5 illustrates a format employed for storing multimedia data and index data on a hard disk included in the analysis/storage device of FIG. 2.

FIG. 9A illustrates a parameter setting operation in connection with a first audio analysis algorithm.

FIG. 24 schematically illustrates concurrent audio and video monitoring of a swimming pool.

FIG. 25 schematically illustrates concurrent audio and video monitoring of a window.

DESCRIPTION OF PREFERRED EMBODIMENTS

Figure 1:
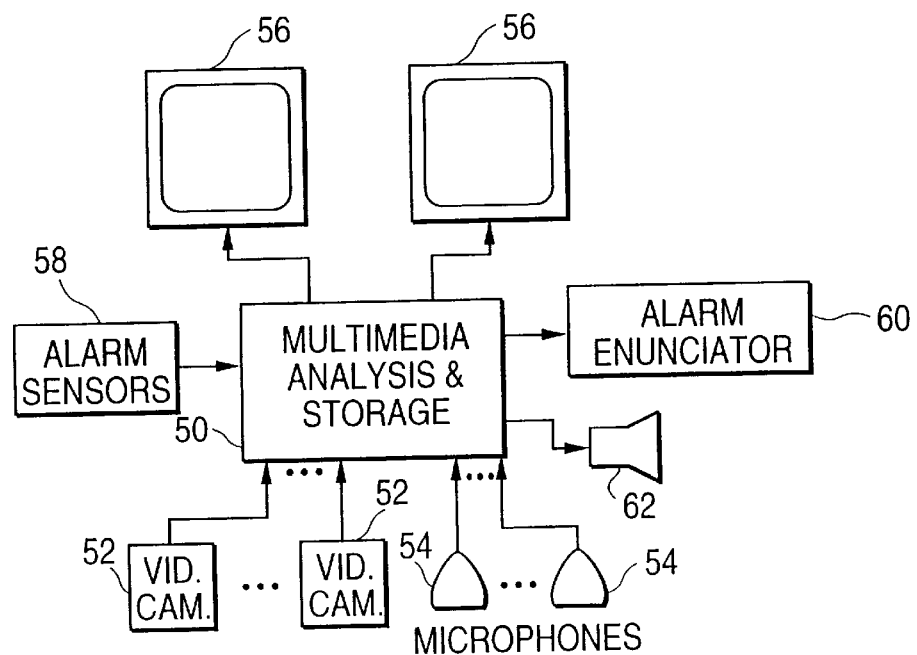
FIG. 1 presents in block diagram form an arrangement of input and output devices associated with a multimedia analysis and storage device provided in accordance with the present invention.

FIG. 1 shows, in block-diagram form, a configuration of input and output devices associated, in accordance with the invention, with a multimedia analysis and storage device to be described below. The analysis and storage device itself is indicated by reference numeral 50.

As seen from FIG. 1, one or more video cameras 52 are connected to provide respective video signal streams as input to the analysis/storage device 50. A preferred embodiment of the analysis/storage device includes input ports for simultaneously receiving 16 video signal streams. Also connected to the analysis/storage device 50 are one or more microphones 54, which provide respective audio signal streams as input signals to the analysis/storage device 50. Although the microphones 54 are shown as being separate from the video cameras 52, it is contemplated that at least some of the microphones 54 may be physically integrated with video cameras. Also associated with the analysis/storage unit 50 are other components typically found in video security systems, including display monitors 56, mechanically actuatable alarm sensors 58 and an alarm enunciator 60. Also connected to the analysis/storage device 50 is at least one loudspeaker 62.

Streams of video signals respectively generated by the video cameras 52, and received at the analysis/storage device 50, are selectively directed from the device 50 for display on the monitors 56. The signals may be displayed in a variety of formats including full screen, or in windows taking up only a portion of the image plane. Plural display windows may be formed on one or both of the monitors 56 so that plural video streams are displayed simultaneously on a single monitor. The monitors may be conventional items such as known NTSC or SVGA monitors.

The alarm sensors 58 are also preferably conventional items, and detect events such as opening or closing of doors, windows, and display cases, etc. When such an event is detected, the alarm sensor in question generates a signal indicative of the event, and the resulting signal is provided to the analysis/storage device 50.

The loudspeaker 62 is selectively driven by an audio signal stream output from the analysis/storage device 50 to generate a series of audible sounds.

The alarm enunciator 60 is actuated by an alarm signal output from the analysis/storage device to generate an audible and/or visual indication of an alarm condition. The alarm signal driving the enunciator 60 may be looped through the analysis/storage device 50 from one or more of the alarm sensors 58, or may be generated within the analysis/storage device 50 itself. The alarm condition may be declared by a human operator, or may be the result of an audio, video or multimedia analysis process carried out by the analysis/storage device 50 with respect to one or more of the input audio and video signal streams provided by the microphones 54 and the video cameras 52.

The input and output components shown in FIG. 1 are not exclusive, and it is contemplated that, for example, user-actuated input devices such as a mouse, a keyboard, and/or a camera control device may be interfaced to the analysis/storage device 50.

Other variations in the component configuration of FIG. 1 are also contemplated. For example, the number of monitors may be reduced to one or increased to a number larger than two. Other peripheral devices, such as printers may be present, and there may also be auxiliary data storage devices in addition to storage devices that are integrated within the analysis/storage device 50. There may also be included in the component configuration of FIG. 1 a Point of Sale Exception Monitoring system (sometimes identified as a "POS/EM"™ system) interfaced to the analysis/storage device 50. Other sources of data that could be interfaced to the analysis/storage device 50 include a point-of-sale terminal without exception monitoring, a magnetic stripe card reader, or an automated teller machine. Moreover, the analysis/storage device 50 may be networked with other analysis/storage devices, connected to a host computer and/or equipped for dial-up connection with an external computing device.

Figure 2:
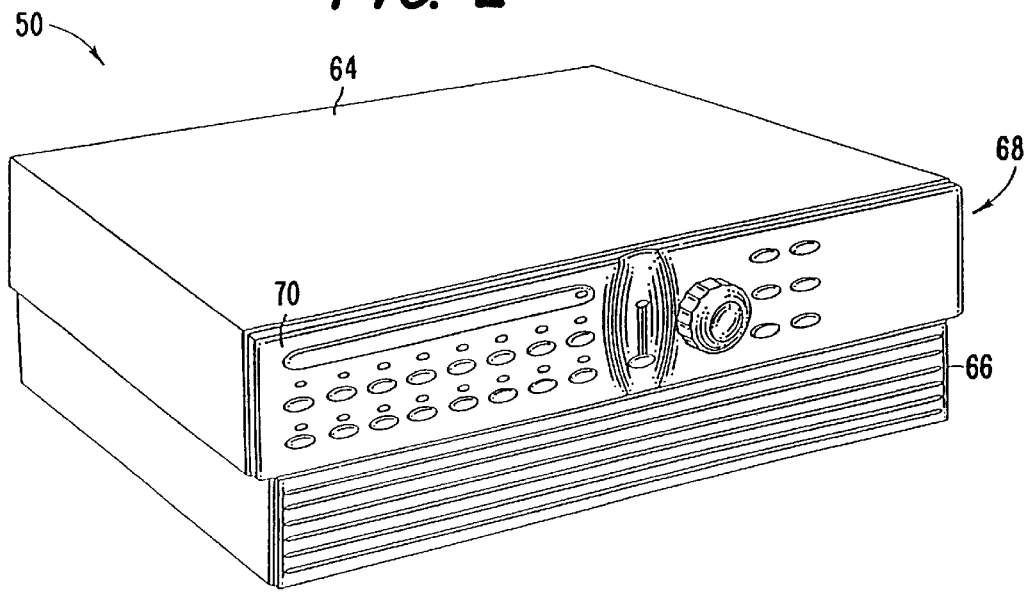
FIG. 2 is a perspective view showing the analysis and storage device of FIG. 1.

FIG. 2 is a perspective view of the multimedia analysis/storage device 50.

The internal components of the analysis/storage unit 50 are contained within a molded plastic housing 64. As will be seen, the internal components include control and signal processing circuitry, as well as a number of data recording devices. For example, integrated within the analysis/storage unit 50 are preferably two or more fixed or "hard" data recording drives of the magnetic type, as well as at least one drive for a removable data storage medium. A preferred embodiment includes both a floppy disk drive and a digital audio tape (DAT) drive. The floppy drive may be used for loading software programs; the DAT drive may be used to record multimedia data, retrieved from the internal hard drives, for permanent or archival storage on a magnetic tape formatted in accordance with the standard DAT format. Access to the drives for the removable media (which are not shown in the drawing) may be had via a hinged dust shield 66 provided at a front elevation 68 of the housing 64.

Also provided at the front elevation 68 is a front panel 70 on which a plurality of switches are mounted. The switches permit the user to control various functions of the device, such as selecting input cameras for recording, setting a format for a displayed video signal, and controlling video and audio playback operations.

An embodiment of a device which may be modified and programmed according to the teachings of the present invention is currently being sold under the trademark "INTELLEX" by the assignee of the present invention, Sensormatic Electronics Corporation, Boca Raton, Fla.

Figure 3:
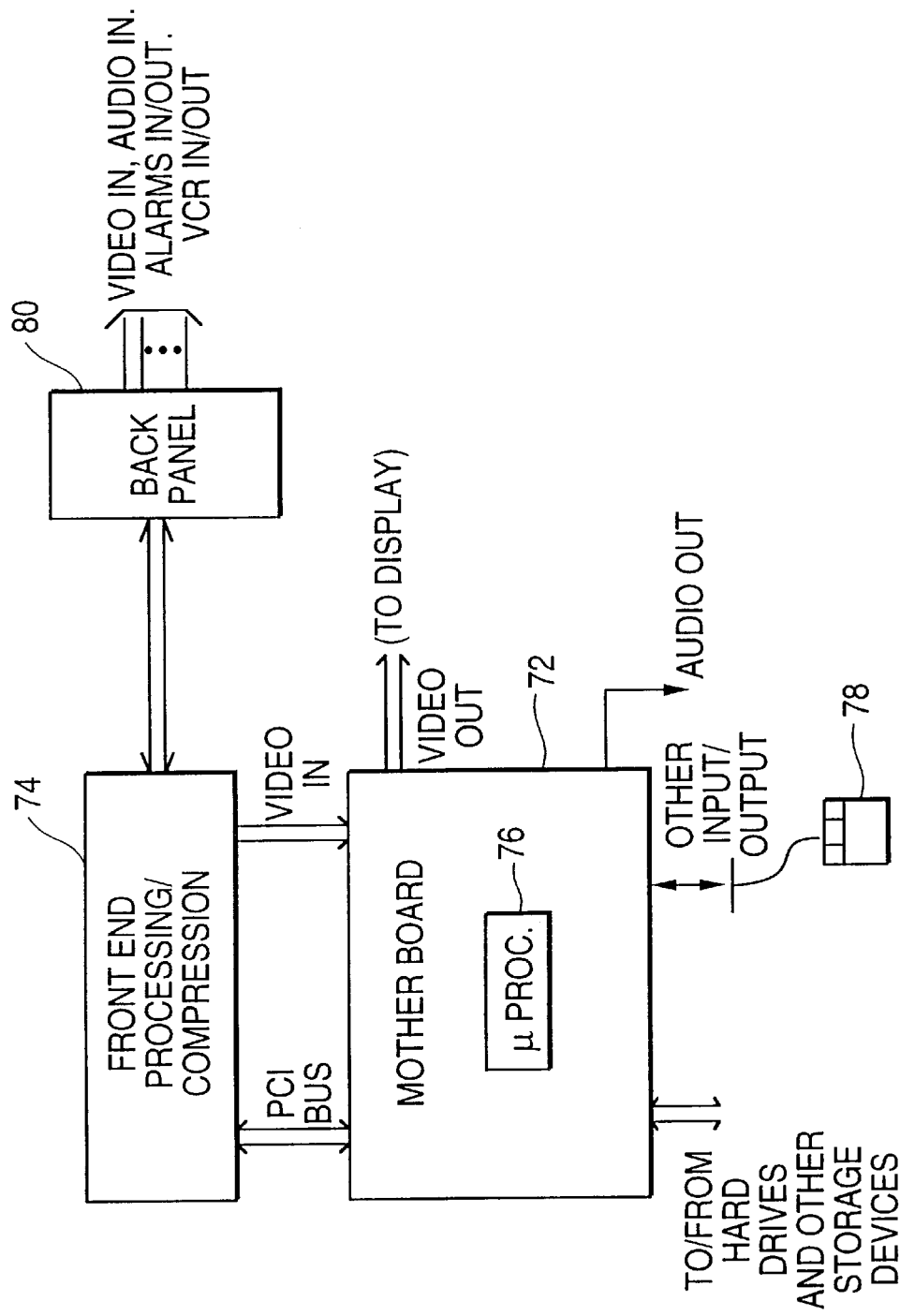
FIG. 3 is a summary block diagram representation of electronic components of the analysis and storage device of FIG. 2.

An overview of the internal components of the analysis/storage device will now be provided, with reference to FIG. 3. As seen from FIG. 3, major components include a motherboard 72, and front end processing/compression electronics 74. The motherboard 72 provides the overall intelligence and control for the analysis/storage device. Preferably the motherboard 72 is constructed in accordance with conventional architecture for personal computer motherboards. The central processing unit for the motherboard is preferably constituted by a conventional microprocessor 76, which may, for example, be one of the models of the well-known Pentium line of microprocessors.

The motherboard 72 controls, and exchanges data with, data storage devices such as the above-mentioned hard disk drives, DAT drive and floppy disk drive. The motherboard is also adapted to receive user control signals which may be input via front panel 70 (FIG. 2) or via conventional user input devices such as a mouse 78 (FIG. 3) and/or a keyboard (not shown). The motherboard 72 also exchanges data with the front end processing/compression electronics 74 while receiving input digital audio and video signals from the front end electronics 74. In addition, the motherboard 72 provides video and audio output signals to drive a monitor or monitors and a speaker or speakers (not shown in FIG. 3). It should be understood that the motherboard 72 includes conventional features such as program memory, working memory, data communication input and output ports, data signal bus connections, interfaces for recording medium drives, video input and output interface ports, and an audio output interface port. All of these are preferably of conventional construction.

Figure 4:
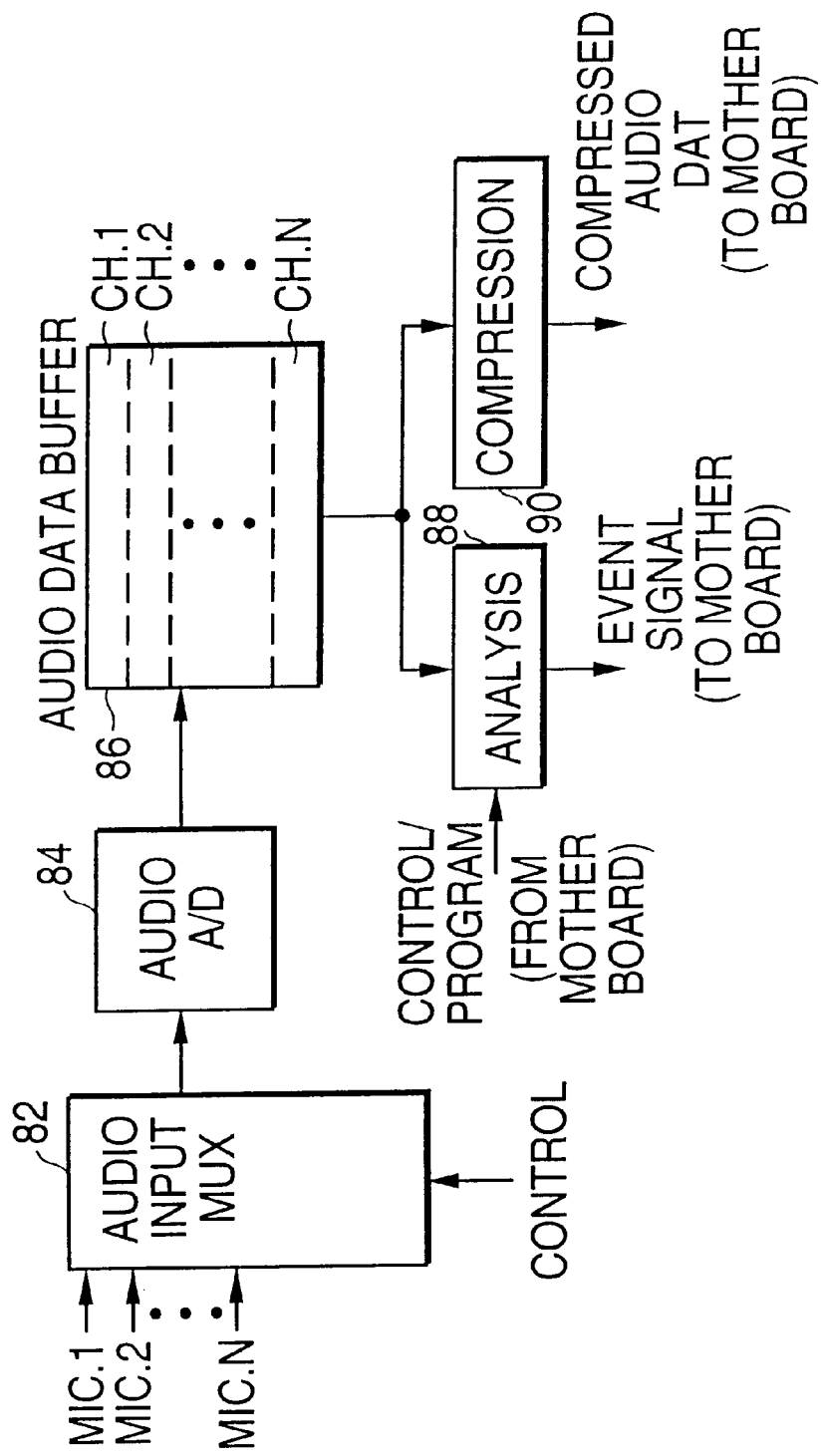
FIG. 4 is a block diagram representation of audio signal processing channels included in the circuitry of FIG. 3.

The front end electronics 74 provide signal processing with respect to input video and audio signals received via a back panel 80. The arrangement of the front end electronics 74 in respect to its video signal processing functions may be like that incorporated in the above-mentioned INTELLEX video recorder and/or as disclosed in the above-referenced parent patent application. Features of the front end electronics 74 in regard to input audio signal processing are schematically illustrated in FIG. 4. A number of input audio signal streams (which may correspond to 8 channels, for example) are received at the back panel (FIG. 3) and then are provided as inputs to an audio input multiplexer 82. In response to control signals which may originate from the motherboard or from a controller (not shown) included in the front end electronics, the audio input multiplexer 82 (FIG. 4) sequentially selects, in turn, each of the input analog audio signals for outputting to an analog/digital conversion circuit 84. The resulting digital audio data for each input stream is stored in a respective portion of an audio data buffer 86. (It is also contemplated to provide separate A/D and buffering channels for each input audio stream for uninterrupted recording of each stream.)

The audio data temporarily stored in the buffer 86 is provided in parallel to an analysis circuit 88 and a compression circuit 90. The analysis circuit 88 responds to control and/or programming signals received from the motherboard and performs content analysis algorithms to detect predetermined features in the input audio signal. Results of the analysis are reported to the motherboard.

The compression circuit 90 applies a data compression algorithm to the input audio data streams. The audio data compression may, for example, be performed in accordance with a conventional audio data compression algorithm. The resulting compressed audio data is then sent to the motherboard for storage on one of the hard drives.

Preferably the analysis and compression functions are performed on respective digital signal processing chips, which may also be utilized, respectively, in connection with input video signal content analysis and compression.

FIG. 5 illustrates a format in which compressed video and audio data are stored on one or more of the hard disk drives of the analysis/storage device. As seen from FIG. 5, the data stored on the hard drives includes compressed video and audio data files indicated generally at 92 and index data indicated generally at 94. The video data corresponds to the incoming streams from all of the cameras which are connected to the analysis/storage device and which are currently selected for recording. A preferred embodiment of the device supports recording simultaneously video signals streams generated by up to 16 cameras. The audio data also corresponds to the incoming streams of audio signals generated by all of the microphones connected to the analysis/storage device and currently selected for recording. Both the video data and the audio data are stored in an audio/video interleave (AVI) format.

The data corresponding to the streams of incoming video and audio signals are stored interleaved together in the form of fixed length files 96, of which P files 96 (P being a positive integer) are shown in FIG. 5 as being recorded on the hard disk. A preferred size for each of the files 96 is about 20 megabytes. By dividing up the streams of video and audio data into files, loss of data due to a drop out or data corruption on the hard drive can be limited.

The data files may also include text and/or numerical data from auxiliary sources such as card-readers, ATM terminals or point-of-sale terminals.

In addition to the quasi-permanent video and audio data files 96, there are also stored on the hard disk video and audio data maintained in a pre-alarm buffer section of the disk (indicated at reference numeral 98). The pre-alarm buffer 98 preferably stores video data corresponding to incoming video signals from all cameras, and audio data corresponding to all microphones, whether or not the cameras and microphones were selected for permanent recording. The pre-alarm buffer 96 is preferably implemented as a ring buffer on the hard disk and may, for example, store all of the video fields captured at the front end electronics, as well as segments of all of the input audio streams, over a period corresponding to the past 60 seconds.

Turning now to the index data 94 on the hard disk, overall indexing covering all of the files 92 is indicated at reference numeral 100. For each of the P files 96, a starting date and time and an ending date and time are provided. In addition, file-specific data is illustrated at 102 and indicates, for each field of video data, or each segment of audio data, the date and time at which the field or audio segment was captured, the camera or microphone by which the field or audio segment was captured, event-related information, and the offset within the file at which the field or audio segment can be found. As indicated at reference numeral 104, the event information given for a particular field or audio segment may include data indicative of the occurrence of more than one type of event at the time that the field or audio segment was captured. The detection of events may be accomplished through the alarm sensors 58 discussed in connection with FIG. 1 and/or by analysis of characteristics of the video or audio signal stream. The analysis may have occurred either at the time that the signal stream was received, or may have been applied to a signal stream that was played back from the hard disk. The audio or video signal stream analysis algorithms used to detect the events may return confidence factor values in addition to detecting that an event has occurred. In such cases, the data indicating that an event has been detected may be accompanied by the confidence factor provided by the event detection algorithm, as indicated at reference numeral 106.

Figure 6:
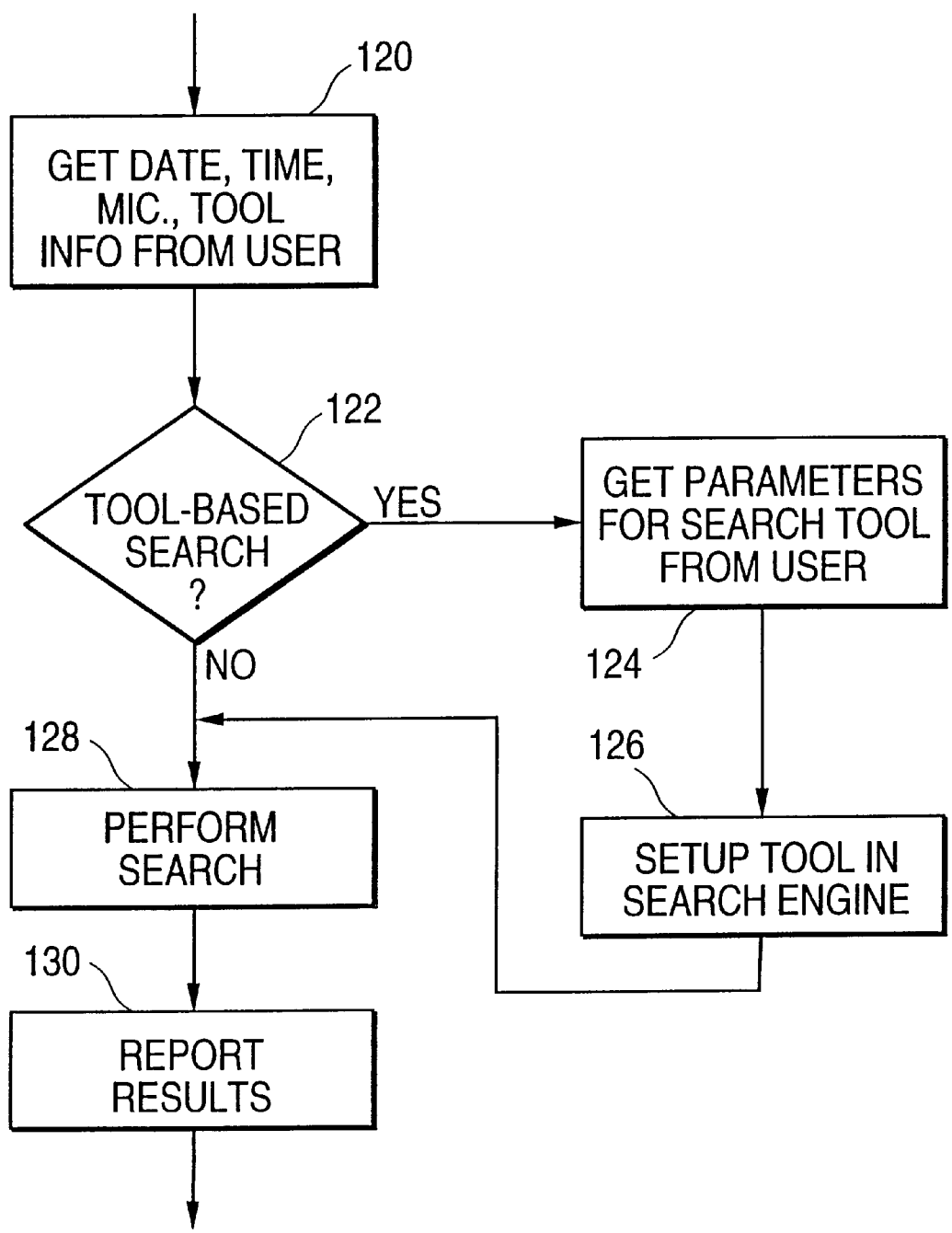
FIG. 6 illustrates in flow-chart form an audio data search software module included in software for controlling a primary processing circuit included in the analysis/storage device.

FIG. 6 illustrates processing carried out by the motherboard CPU in connection with searching the multimedia database for an audio segment which the user wishes to find. When a search operation is initiated by a user (through interaction with a graphical user interface, as will be explained below), the system obtains from the user search parameters indicative of the date, time and source microphone for the audio information of interest to the user (step 120). In addition, the system obtains from the user an indication as to whether the search is to employ a sound data analysis algorithm (also referred to as a "tool"). Step 122 is a decision block at which it is determined whether a sound data analysis-based search is requested. If so, the user is permitted to provide input indicative of the type of sound data analysis algorithm to be performed, as well as, if appropriate, one or more parameters to constrain the execution of the sound data analysis algorithm (step 124). On the basis of this information, the sound data analysis algorithm is prepared to operate with respect to the audio data to be retrieved during the search (step 126). Following step 126 (or immediately following step 122 if no sound data analysis is requested) is step 128, at which the database is searched to retrieve the audio data requested by the user. If sound data analysis was requested, then the analysis algorithm is applied to the retrieved audio data. In either case, the outcome of the search is reported (step 130).

Figure 7:
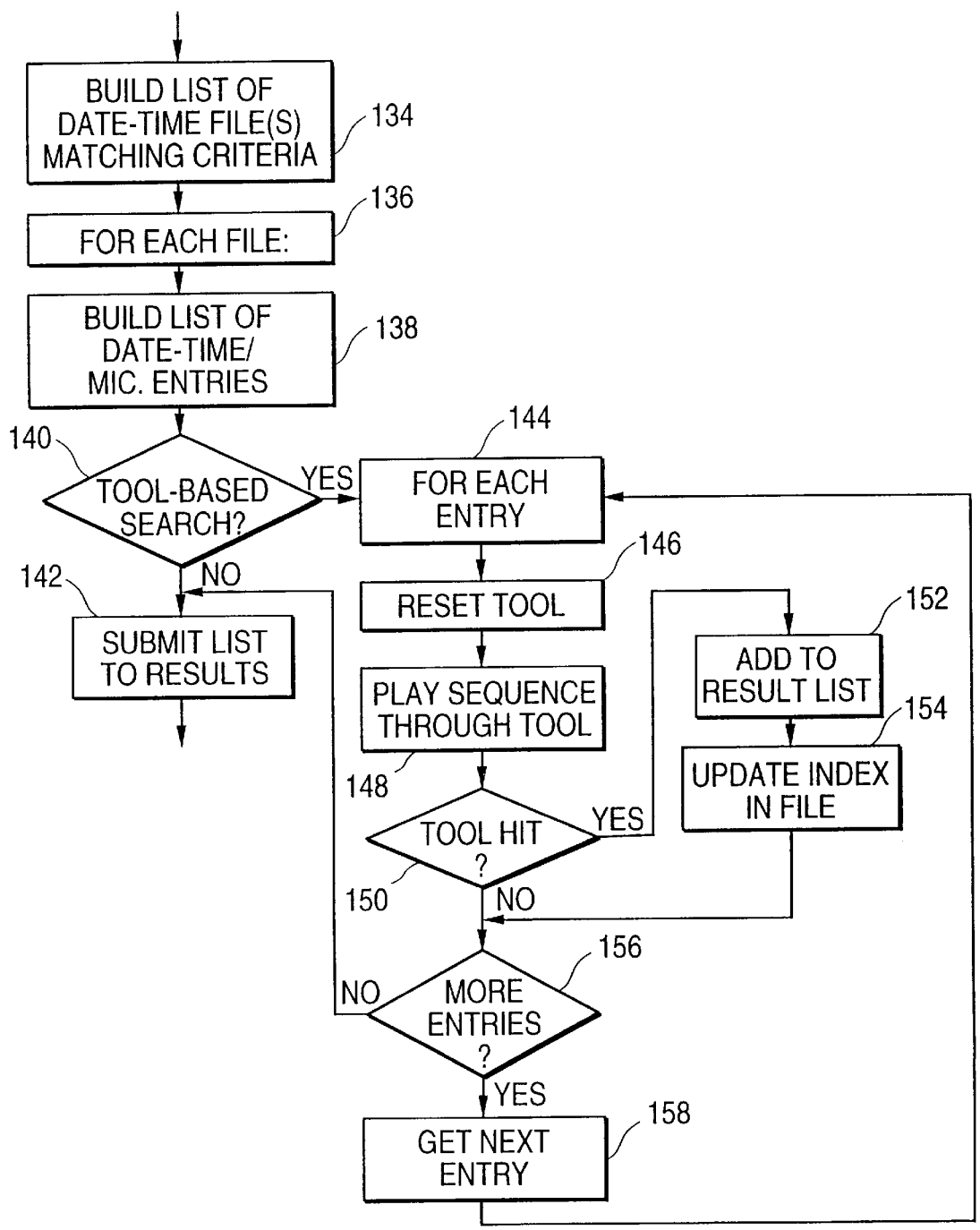
FIG. 7 illustrates in flow-chart form a "perform search" block included in FIG. 6.

There will now be provided, with reference to FIG. 7, a more detailed description of the process step shown as step 128 ("perform search") in FIG. 6. Step 128 initially includes building a list of one or more date and time files that match the search criteria specified by the user (step 134, FIG. 7). For each file on the list, the following steps are performed, as indicated at step 136. A list of the date, time and microphone entries is generated for each of the files (step 138) and then a decision is made as to whether a sound data analysis algorithm is to be applied (step 140). If not, i.e. if no sound data analysis was requested by the user, then the list is simply submitted for reporting (step 142).

However, if a sound data analysis based search has been requested, then for each entry in the list assembled at step 138, the following procedure is followed, as indicated at step 144: First the sound data analysis algorithm is reset (step 146) and then the sequence of audio data segments corresponding to the entry is analyzed using the selected sound data analysis algorithm (step 148). It is then determined at step 150 whether the sequence of sound data segments exhibit a characteristic that was to be detected by the sound data analysis algorithm. If so, the sequence is added to a positive result list (step 152) and the index information for the file is updated to indicate detection of the event (step 154). That is, the event-related data shown at 104 in FIG. 5 is updated to indicate detection of the event, as well as the confidence factor applicable to the event detection decision. It will be appreciated that if the characteristic of interest is not found to be present in the sequence of sound data segments, then the sequence is not added to the result list and the index information is not updated. In any case, following step 154, or directly following step 150 if the characteristic of interest was not detected, it is determined whether more entries are present on the list (step 156). If not, the results obtained as a result of the image analysis are reported (step 142). However, if more entries are present, the next entry is retrieved (step 158), and the loop starting at step 144 is performed with respect to the next entry.

Figure 8:
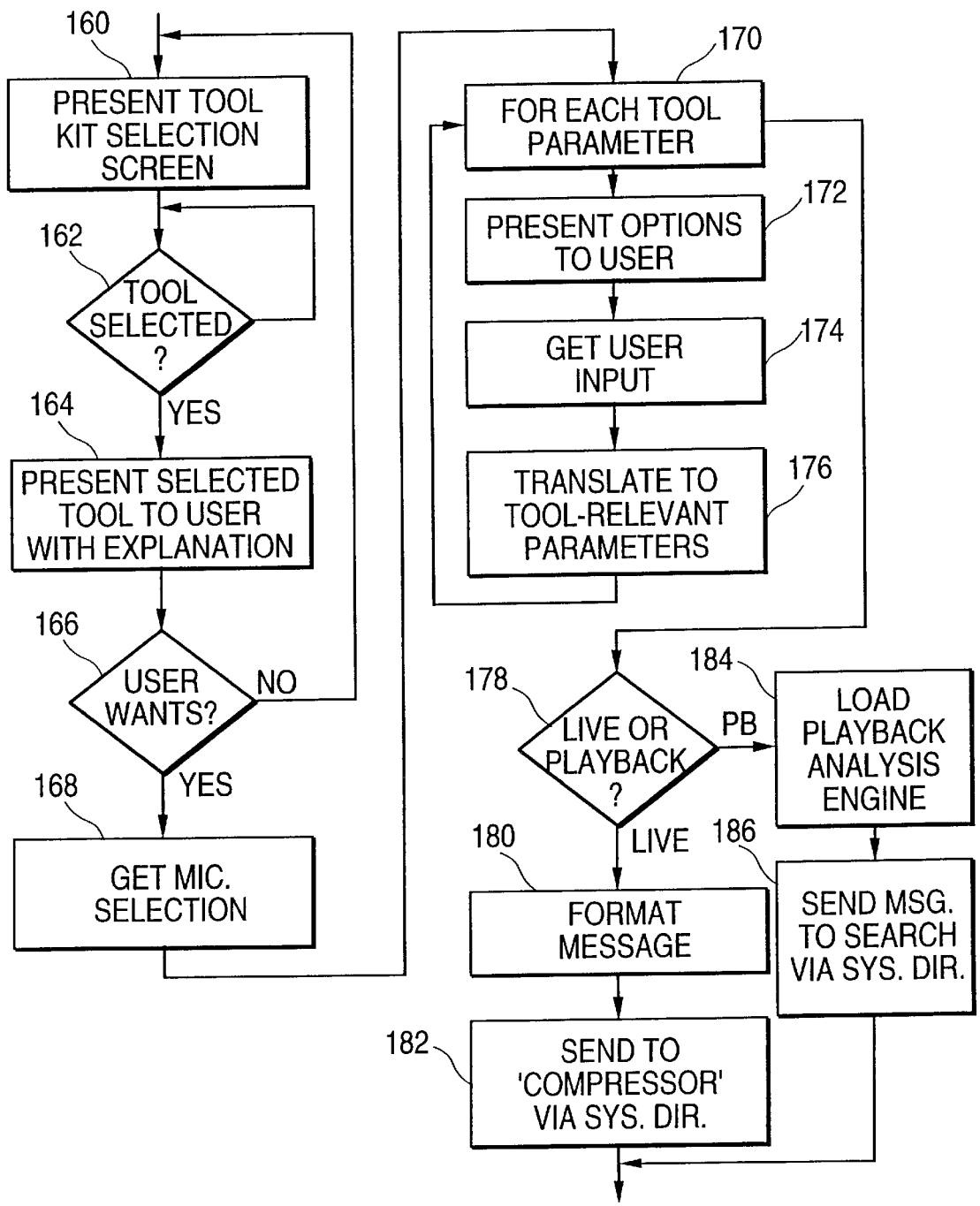
FIG. 8 illustrates in flow-chart form software which controls the primary processing circuit in connection with selecting and setting up an audio analysis algorithm.

FIG. 8 illustrates processing involved in the selection and setup of a sound data analysis algorithm or "tool". As indicated at step 160, the user is initially presented with a screen display in which a number of tools (analysis algorithms) are available for selection by the user. For example, a respective icon corresponding to each available tool may be displayed on the screen. Or, a menu listing the available tools by name may be displayed. Examples of screen displays showing tool menus are provided at FIG. 22 (tool-based search) and FIG. 23 (pre-scheduling of a "live tool", i.e. analysis of an input audio stream as the stream is received). A more detailed description of these screen displays will be provided below.

Following step 160 is step 162, at which it is determined whether the user has selected a tool from the tool kit. If so, a new screen is generated, or the selection screen is altered, in a manner to indicate which tool has been selected (step 164). It is then determined (step 166) whether the user wishes to actuate employment of the selected tool. If not, the process loops back to step 160. However, if the user does wish to actuate use of the tool, then step 168 follows, at which the user indicates, by microphone number or name, the source of the audio signal streams to which the selected tool is to be applied. There follows a loop (as indicated at step 170) which is to be applied to each parameter relevant to the selected tool. The loop is made up of steps 172 through 176. At step 172, the options selectable by the user with respect to the parameter are indicated to the user. At step 174 the user's input as to the desired option is received, and at step 176 the parameter setting provided by the user is translated into data that is relevant to the sound data analysis process.

After the tool parameter loop has been carried out as to each parameter, step 178 follows, at which it is determined whether the tool in question is to be applied to live audio data or reproduced audio data. If live audio data is to be analyzed by the selected tool, then a suitable command message or a set of command messages is generated (step 180) and transmitted to the front end electronics by way of a "system director" software module (step 182; as will be appreciated from the parent patent application, the "system director" software module performs a clearing house function with respect to messages sent from or to the motherboard CPU).

On the other hand, if the selected algorithm is to be applied to reproduced audio signals, then a sound data analysis software component for the motherboard CPU is loaded (step 184) and a suitable command message indicative of the selected algorithm and parameters is sent via the system director software component (step 186).

Examples of parameter setting will now be described. The first example concerns a noise level detection tool, for which illustrations are provided in FIGS. 9A and 19.

The purpose of the "noise tool" is to detect the presence of a sound where there should be none (e.g. sounds of movement in a room that is supposed to be empty) or the absence of sound where sound should be present (e.g. a quiet sound level in proximity to mechanical equipment such as a generator or air conditioner that is supposed to be continuously operated).

Figure 19:
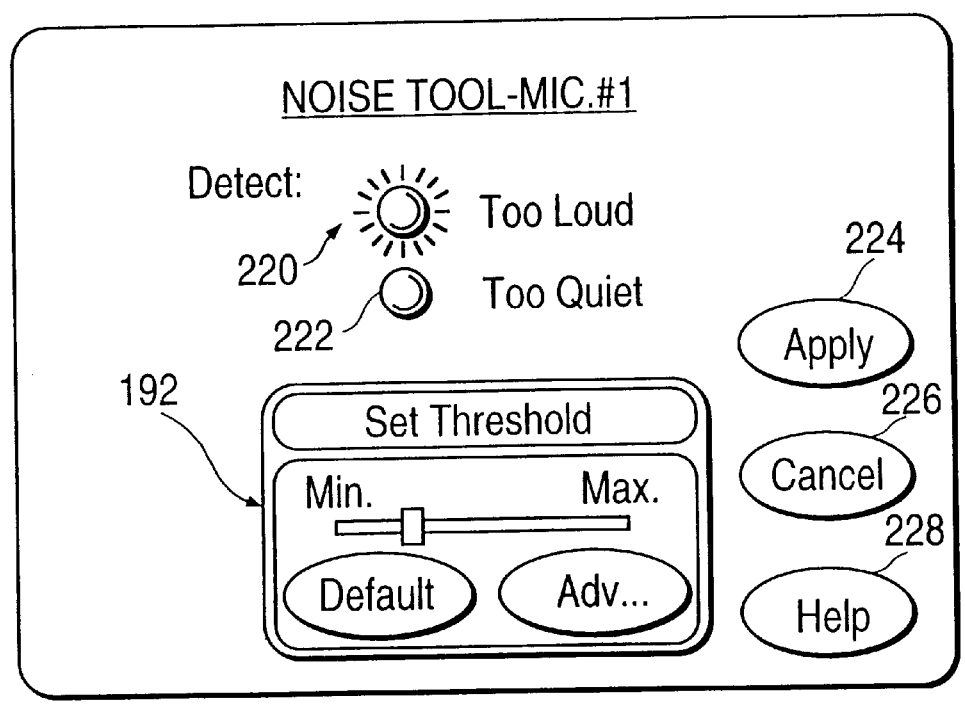
FIG. 19 is a screen display presented to the user in connection with setting up a noise-level-detecting audio analysis algorithm.

FIG. 19 is a screen display of the type that may be presented to the user when the noise tool has been selected. FIG. 9A illustrates the process carried out in connection with threshold setting. Initially in FIG. 9A there is a step 190, which provides for the display of the "slide bar" shown at 192 in FIG. 19. It will be appreciated that the slide bar 192 resembles a conventional graphical user interface element, and is actuatable by a mouse-controlled cursor (not shown) to provide user input as to a parameter. In the case of the noise tool, the parameter to be set is the sound level threshold which is to be used for the analysis algorithm to determine whether the analyzed sound data sequence exhibits an amplitude level that is "too loud" or "too quiet".

Referring again to FIG. 9A, after step 190 there is a decision block 194, at which it is determined whether the user has actuated the slide bar so as to change the threshold parameter setting. If so, the new setting is read via the graphical user interface (step 196) and the resulting data is translated into data indicative of an audio signal amplitude level (step 198). The analysis/storage device then drives the microphone 62 (FIG. 1) to provide to the user an audible indication of the threshold level which the user has selected (step 200). As indicated at step 202, the process of FIG. 9A continues to allow the user to change the threshold level until the user indicates that the tool setup has been completed. At that point, the threshold parameter is saved (step 204).

Figure 9B:
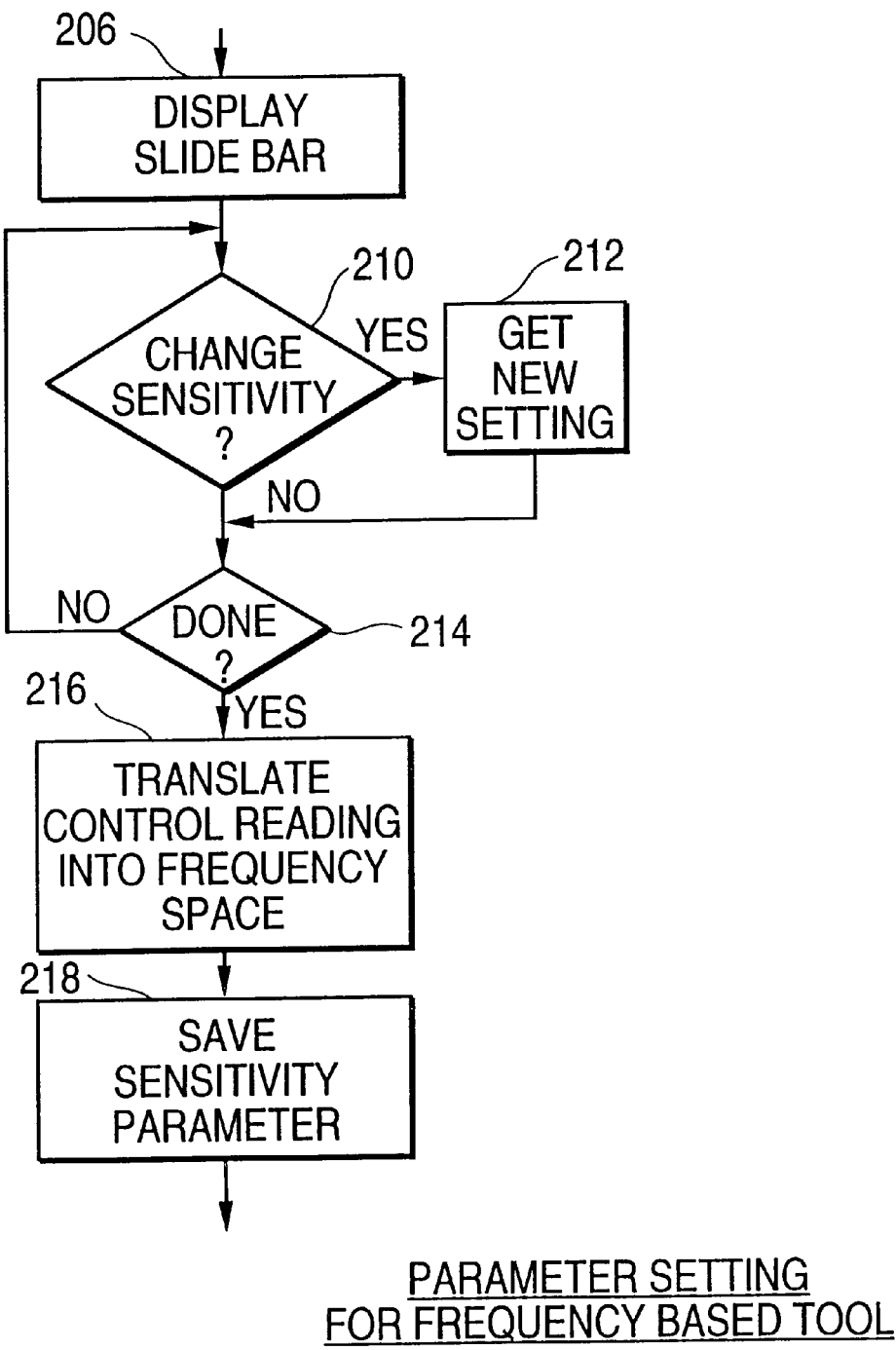
FIG. 9B illustrates a parameter setting operation in connection with a second audio analysis algorithm.
Figure 20:
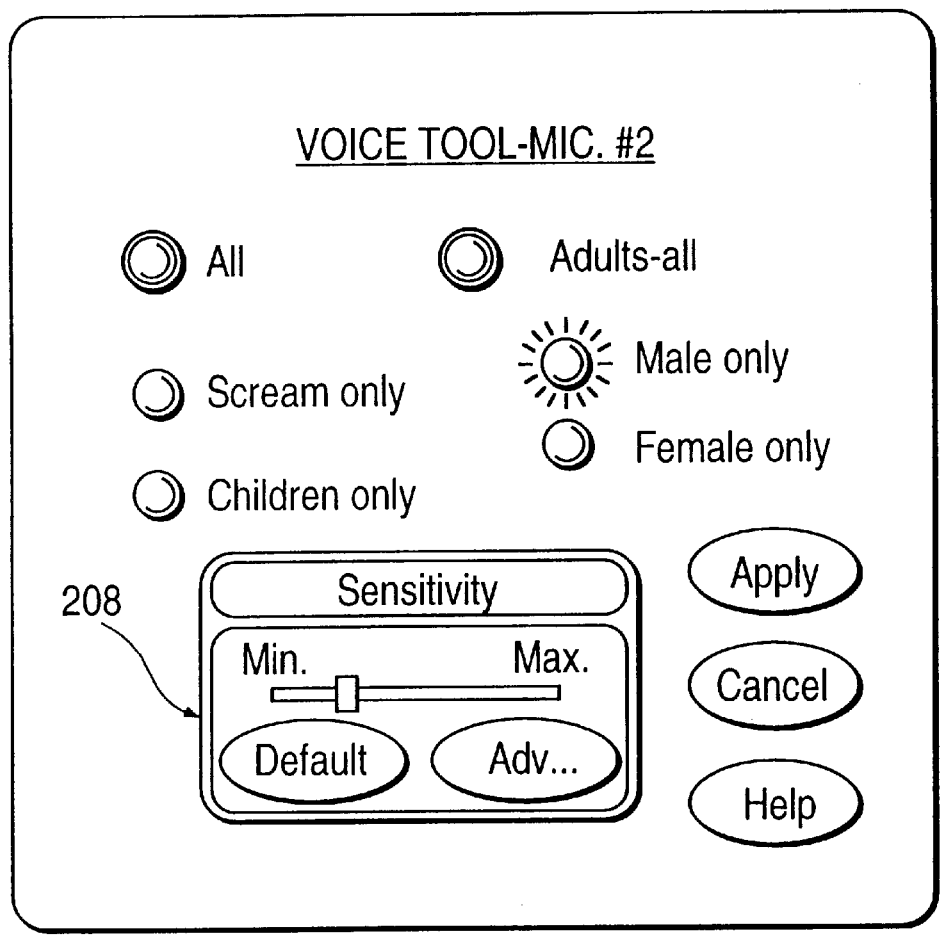
FIG. 20 is a screen display presented to the user in connection with setting up an audio analysis algorithm which detects the presence of human voices.
Figure 21:
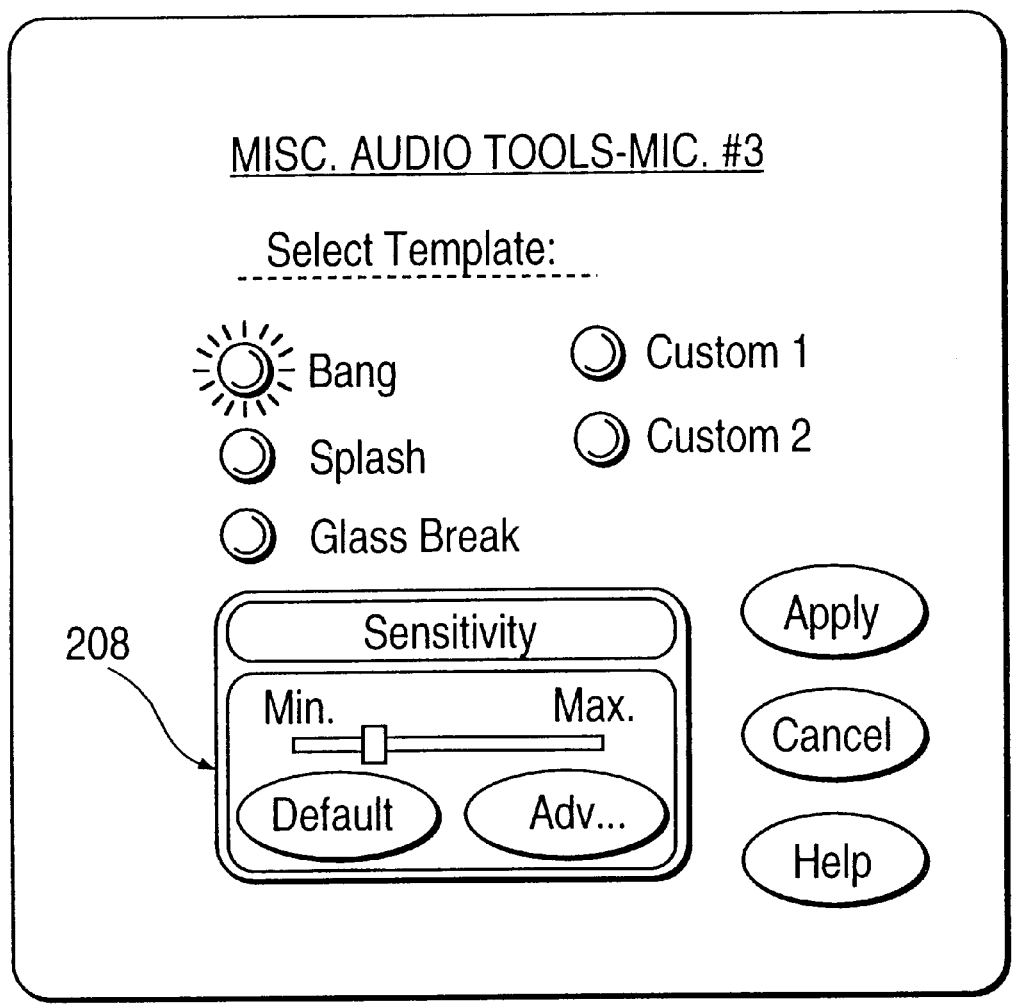
FIG. 21 is a screen display presented to the user in connection with setting up an audio analysis tool which is based on a frequency distribution template.

FIG. 9B illustrates the process by which a sensitivity parameter is adjusted in connection with setting up a sound data analysis algorithm in which the sound data to be analyzed is compared with a frequency distribution template. Examples of this type of analysis algorithm will be discussed below in connection with FIGS. 20 and 21. The process of FIG. 9B begins with a step 206, at which a slide bar, such as that indicated at 208 in FIGS. 20 and 21, is presented to the user. Continuing to refer to FIG. 9B, it is then determined, at step 210, whether the user has manipulated the slide bar so as to change the sensitivity parameter. It should be understood that "sensitivity" refers to the degree to which the frequency distribution of the signal stream being analyzed resembles the relevant template for the tool being applied. If so, the setting data provided by the graphical user interface is obtained (step 212) and it is then determined whether the user has indicated that the tool setup is complete (step 214). If not, the user is free to change the sensitivity setting again. Otherwise, the setting data is translated into data which corresponds to frequency space so as to define the degree of similarity that the audio data stream being analyzed must bear to the relevant frequency template if an event is to be declared (step 216). Then the sensitivity parameter is stored (step 218).

Further aspects of the "noise tool" will now be described, with reference to FIGS. 19 and 10A. Referring once more to FIG. 19, it will be recalled that slide bar 192 permits the user to set a sound amplitude threshold level. Cursor-actuated indicators 220 and 222 are respectively provided to allow the user to indicate that the tool is to detect sound levels that are above or below the threshold. In the example shown in FIG. 19, the "too loud" indicator 220 is illuminated to indicate that the tool is to detect amplitude levels that are above the threshold. A cursor-actuated button 224 allows the user to indicate that the setup function is complete and the tool is to be applied to the selected audio stream. Cursor-actuated button 226 allows the user to exit from the setup screen without applying the analysis tool, and button 228 permits access to a "help" function.

Figure 10A:
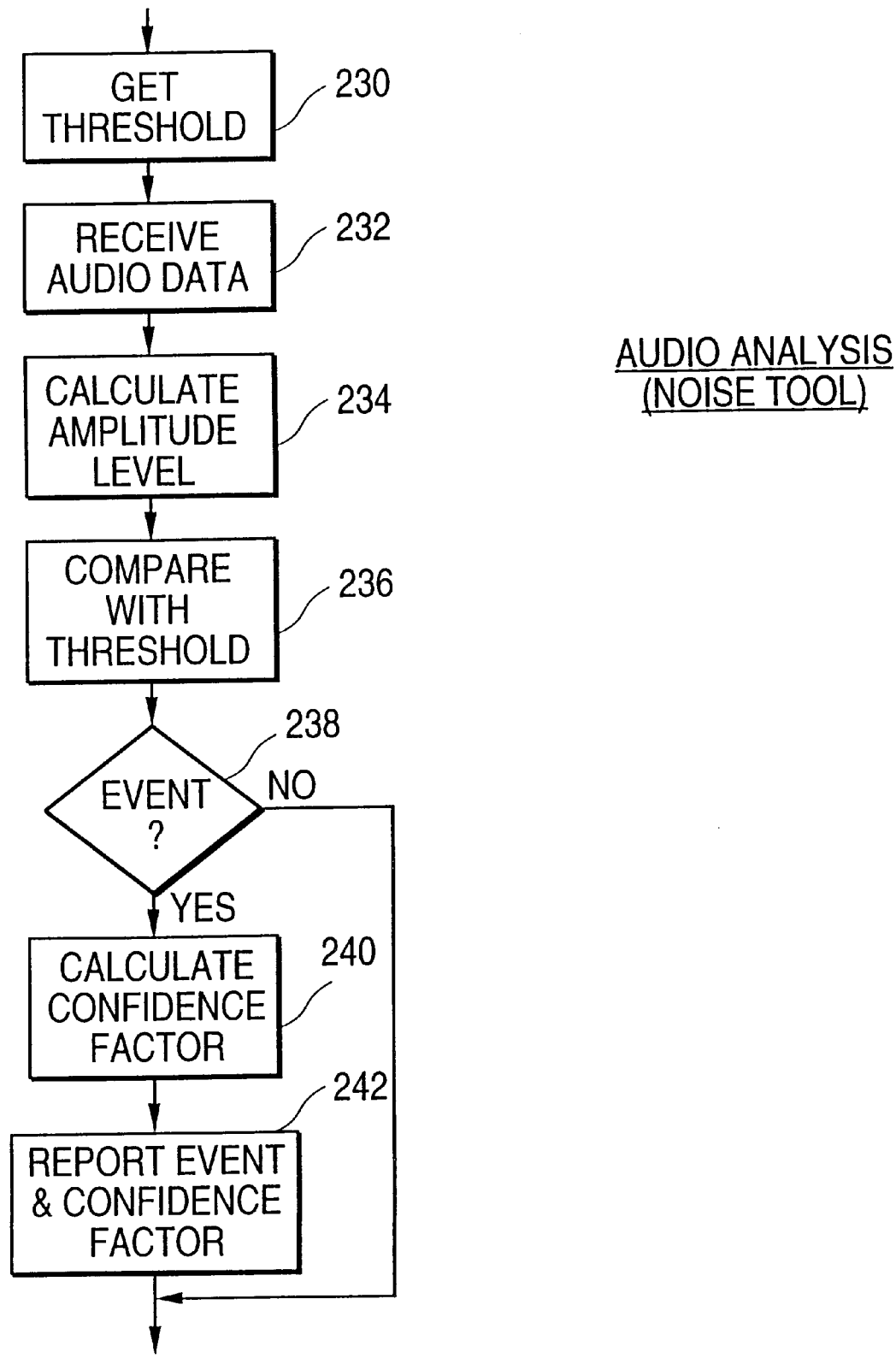
FIG. 10A is a flow-chart representation of the first audio analysis algorithm.

FIG. 10A illustrates operation of the noise tool. Initially, the threshold level to be applied is obtained (step 230). Then the sequence of audio data to be analyzed is received, either as an input stream currently generated from a selected microphone, or as a stream of audio data reproduced from the hard disk (step 232). Next, the amplitude level of the audio data stream being analyzed is calculated (step 234) and the calculated amplitude level is compared with the threshold (step 236). On the basis of the comparison, it is determined at step 238 whether an "event" has occurred; that is, whether the feature to be detected by the noise tool is present. If so, a "confidence factor" related to the declaration of the event is calculated (step 240). For example, if the amplitude level of the analyzed audio data stream is close to the threshold level (but on the side of the threshold level to be detected), then a relatively low confidence factor may be generated. But if the amplitude level of the analyzed stream is far from the threshold, then a higher confidence factor would be calculated. Next, at step 242, the occurrence of the event and the confidence factor are reported.

If at step 238 no event was found to have occurred, there is no confidence factor calculation or reporting of the event.

FIGS. 20 and 21 are screen displays provided in connection with setting up analysis tools which detect frequency distribution features in the audio data stream to be analyzed.

FIG. 20 relates to a "voice tool" for detecting whether the sound of a human voice is present in the audio signal stream to be analyzed. Cursor-actuatable indicators are provided which allow the user to select any of the following characteristics for detection: all voices; only adult voices, whether male or female; only male adult voices; only female adult voices; only children's voices; and only screaming voices. Selection of one of these categories results in selection of an appropriate array of frequency distribution profiles or templates which represent typical characteristics of the class of voices to be detected. The "sensitivity" parameter, settable by the user via the slide bar 208, sets the degree of correlation between the audio data to be analyzed and one profile of the set of selected frequency profiles if an event is to be declared.

FIG. 21 is a screen display that permits the user to select from among other analysis tools that compare an audio data stream with a frequency distribution template. Among the choices presented in FIG. 21 are tools which respectively detect a "bang" sound, a splashing sound, or the sound of glass breaking. The user is also permitted to establish additional templates, which may be obtained by analyzing sound data input into the analysis/storage device via floppy disk or reproduced from the hard disk. The user may, for example, elect to add a frequency template derived from the sound of a dog barking. As before, the degree of correlation required for an event to be declared is adjustable via the slide bar 208.

Figure 10B:
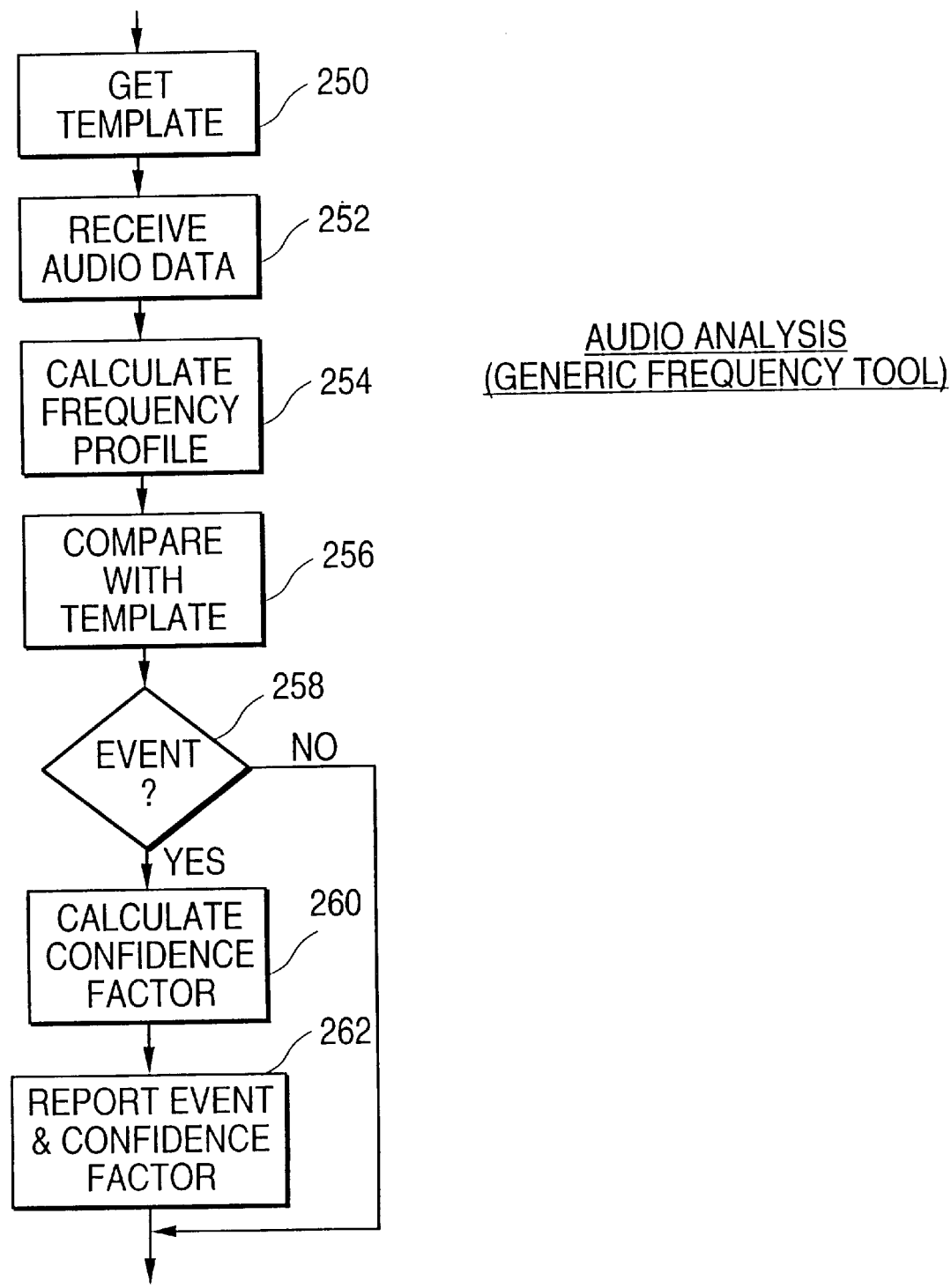
FIG. 10B represents, in generic terms, the second audio analysis algorithm.

FIG. 10B illustrates a generic case of operation of a frequency-template-based audio analysis tool. The process of FIG. 10B starts, at step 250, with fetching of the frequency template to be used for the analysis. Then, as the audio data stream is received (step 252) the frequency distribution profile thereof is calculated (step 254). For example, a Fast Fourier Transform (FFT) may be applied to the audio data stream. Next, the calculated profile is compared with the template (step 256). It is then determined, at step 258, whether the calculated frequency profile matches closely enough with the template to declare an event. If so, a confidence factor indicating the closeness of match is calculated (step 260), and the event and confidence factor are reported (step 262).

Figure 13:
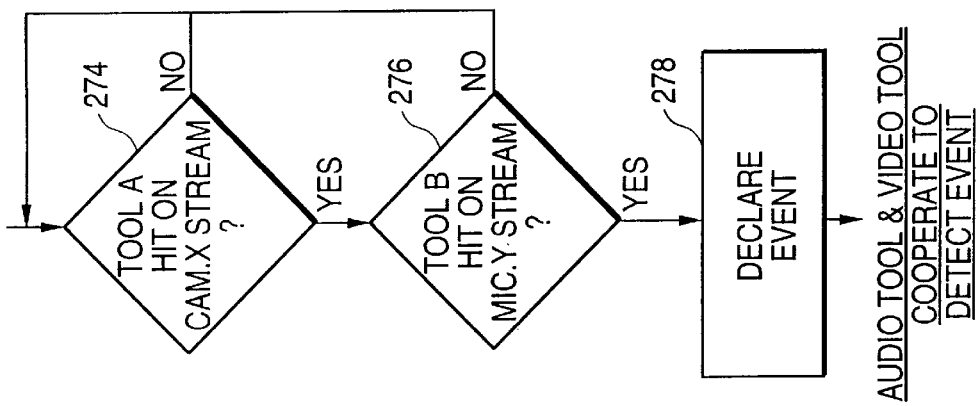
FIG. 13 is a flow-chart which illustrates operation of the analysis/storage device to detect an alarm condition when respective predetermined conditions are detected by two different live analysis algorithms, one being for analyzing audio information and the other for analyzing video information.
Figure 12:
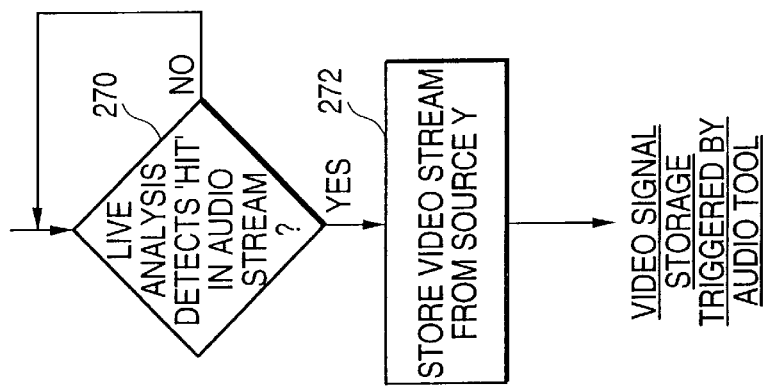
FIG. 12 illustrates in flow-chart form actuation of storage of a video signal stream in response to detection of a predetermined characteristic of an audio signal stream.
Figure 11:
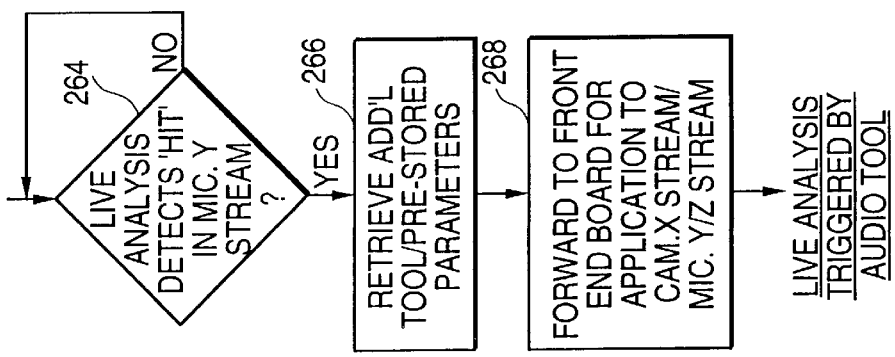
FIG. 11 illustrates in flow-chart form actuation of a second live analysis algorithm (audio or video) in response to detection by a live audio analysis algorithm of a predetermined characteristic of an input audio stream.

FIGS. 11, 12 and 13 illustrate how certain operations of the analysis/storage device can be triggered by results obtained by analyzing "live" input audio signal streams.

In FIG. 11, when a feature of interest is detected in an input audio signal stream (step 264), the analysis/storage device proceeds to retrieve an additional, previously stored, analysis algorithm, with associated pre-stored parameters for the algorithm (step 266). The retrieved analysis algorithm is then forwarded to the front end electronics 74 (FIG. 3) with instructions to apply the retrieved algorithm to a previously determined input signal stream, which may be a video stream generated by a designated camera or an audio stream generated by a different microphone from the one monitored at step 264. Alternatively, the retrieved analysis tool may be an audio tool different from the one applied at step 264, and the instruction to the front end electronics may be to apply the additional tool to the same stream monitored at step 264.

In the process shown in FIG. 12, detection of a characteristic of interest in an audio stream, as indicated at step 270, causes the analysis/storage device to store a video signal stream (step 272) which would not otherwise have been stored. For example, detection of the characteristic of interest in the audio stream causes the analysis/storage device to change the status of a camera connected to the device from "inactive" to "recording", so that fields from the camera are added to a sequence of video signal fields selected for storage. Alternatively, video signal fields which had only been stored in a pre-alarm buffer are transferred to a "permanent" storage portion of the hard disk.

FIG. 13 illustrates a process in which an alarm event is declared when a particular characteristic in an input audio stream is detected at the same time that a particular characteristic in an input video stream is detected. Step 274 represents detection of the pre-determined characteristic of the video stream, and step 276 represents detection of the pre-determined characteristic of the audio stream. The outcome of this combination of respective results of the video tool and the audio tool is the declaration of an alarm event, as indicated at step 278.

FIGS. 24 and 25 illustrate examples of "cooperative" video and audio tools, as in the process of FIG. 13. In FIG. 24, a video camera 52 is positioned and oriented to capture images of the surface 280 of swimming pool 282. Microphone 54 is positioned adjacent to the swimming pool. The video analysis tool applied to the output of camera 52 is set up to detect substantial motion, such as would be caused by an object of significant size falling into the pool. The audio analysis tool applied to the output of microphone 54 compares the frequency profile of the resulting audio signal data with a template indicative of a significant splashing sound. The two analysis tools cooperate to trigger an alarm if an object the size of a child or larger splashes into the pool 282. Use of both tools together greatly reduces the likelihood of false alarms such as might be triggered by the video tool alone as a result of reflections in the pool surface, ripples caused by wind, etc.

FIG. 25 shows camera 52 and microphone 54 positioned to monitor a glass window pane 284. The output of the camera is analyzed to detect motion that would indicate breaking of the windowpane. Similarly, the audio tool applied to the output of the microphone entails comparison of the frequency profile of the audio data stream with a template which corresponds to the sound of glass breaking. Thus, the camera and microphone in FIG. 25 cooperate to detect breakage of the windowpane 284. Use of both tools together helps to prevent false alarms that could result from the video tool itself detecting reflections or motion outside of the window, or caused by the audio tool detecting breakage of a glass object other than the windowpane.

The process of FIG. 13 is just one example of ways in which an audio tool may be "logically combined" with another tool. For example, if voice sounds are detected in a room in which a video tool finds no light is present, an alarm may be declared. Alternatively, detection of either sound or light in a given area may trigger an alarm event. It should be understood that an alarm event can also be triggered by the logical combination of an audio tool with one or more other audio tools.

Figure 14:
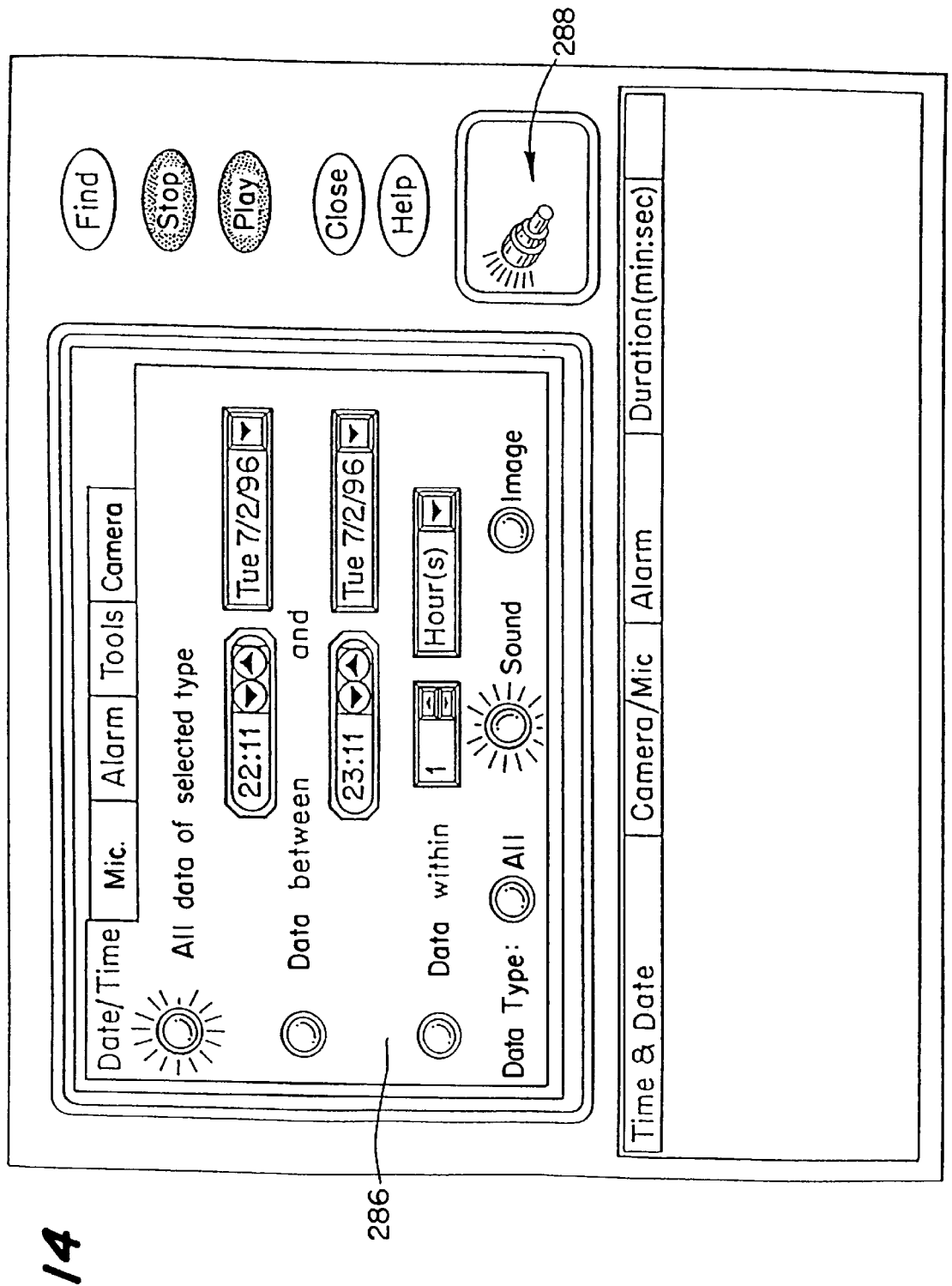
FIG. 14 is a screen display presented to a user of the analysis/storage device in connection with searching for recorded multimedia information.

FIG. 14 is a screen display which permits the user to define parameters for a search to locate audio and/or video data stored in the hard disk or disks of the analysis/storage device. The display 14 includes a dialog box 286 which is one of a number of tabbed dialog boxes available to the user. The selected dialog box in the example of FIG. 14 permits selection of date and time parameters as well as the type of data to be searched (sound, image or both). Other dialog boxes available to the user permit selection of particular microphones, cameras, and alarm conditions, as well as selection of analysis tools to be applied. A searchlight icon 288 is moved in an oscillating sweep pattern while a search is being carried out to indicate the current status of the device to the user.

Figure 15:
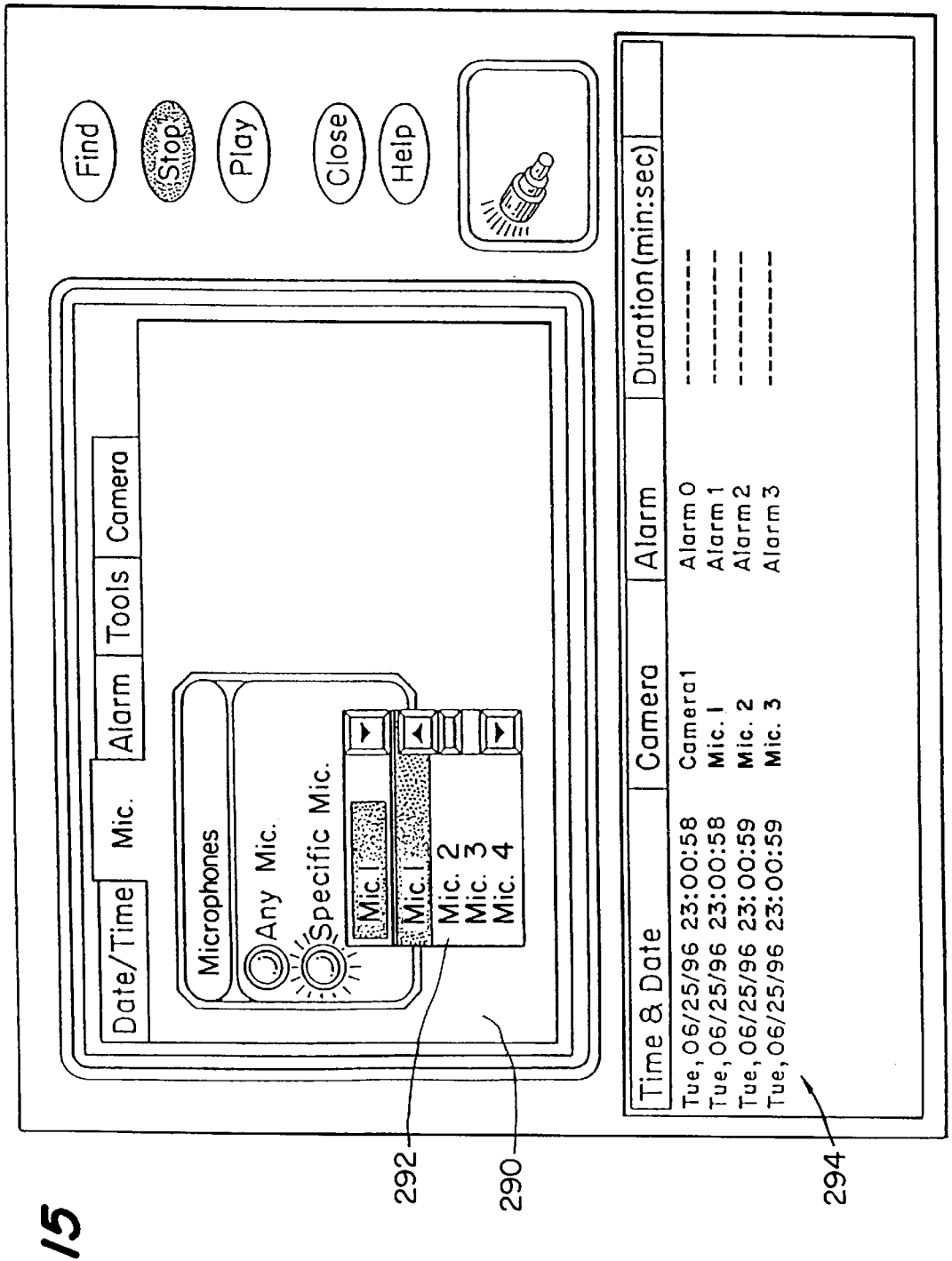
FIG. 15 is a screen display presented to a user in connection with searching for recorded audio information.

FIG. 15 is a screen display similar to that of FIG. 14, but with the microphone selection dialog box 290 in the foreground. The pull-down menu 292 shown in FIG. 15 permits selection of the signal stream from a particular microphone for searching. Results of the search are presented in the results field at 294.

Figure 16:
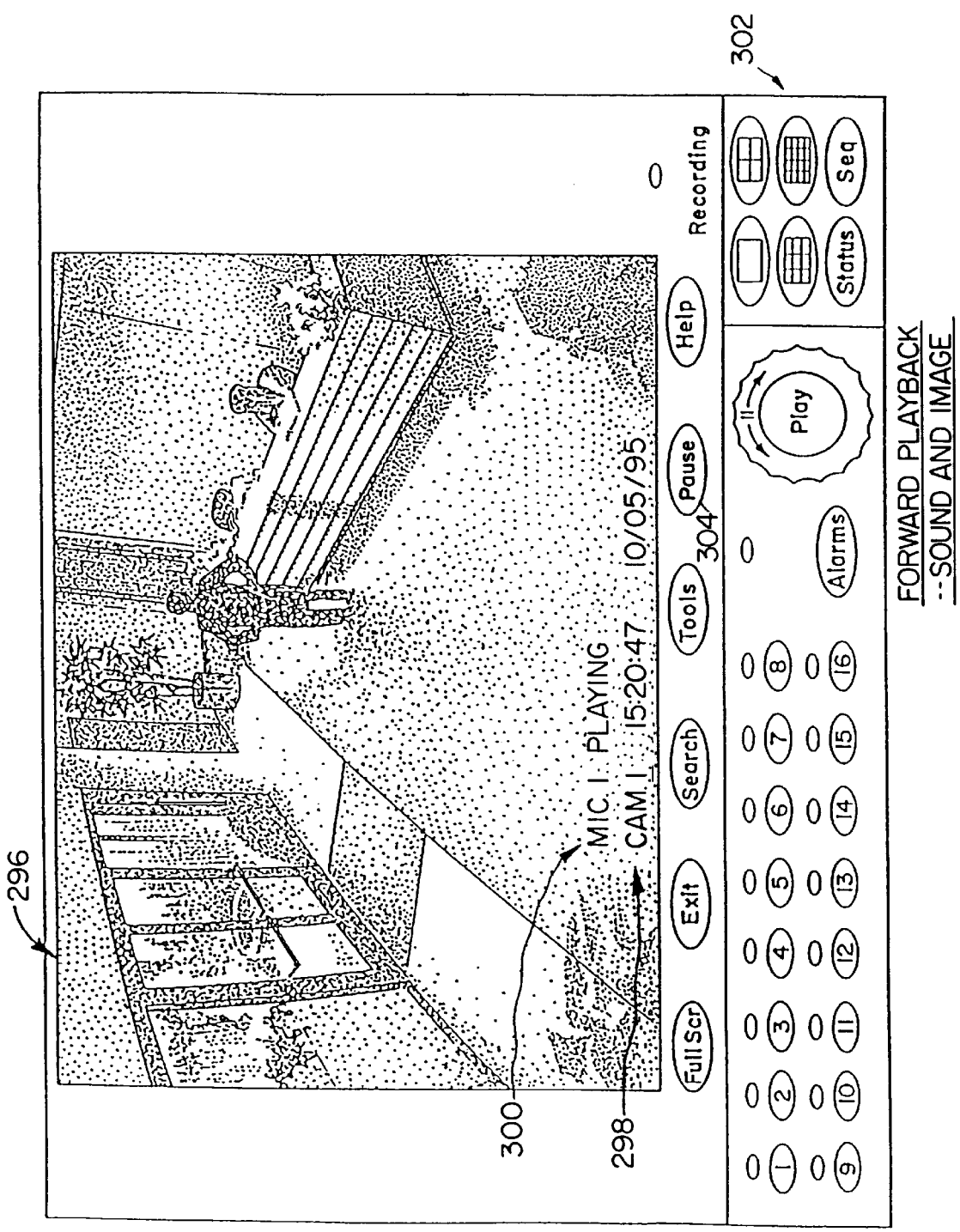
FIG. 16 is a screen display generated by the analysis/storage device when operating in a playback mode.
Figure 17:
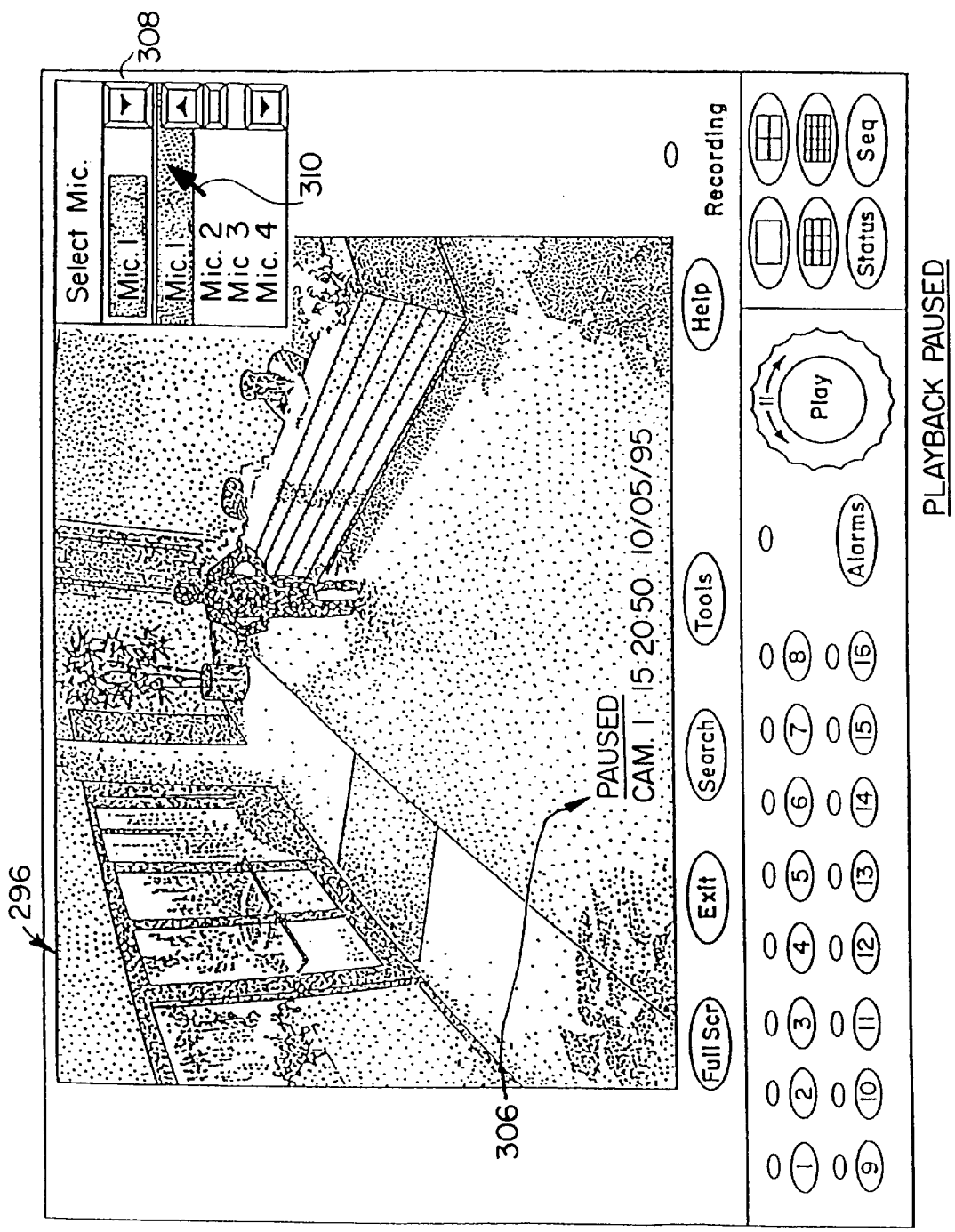
FIG. 17 is a screen display generated by the analysis/storage device in a paused playback mode, including a pull-down menu which permits the user to select a recorded stream of audio signals for playback.

FIG. 16 is a screen display which may be provided during playback of a stored image stream. The display includes an image window 296 in which the sequence of video images is displayed. Alphanumeric characters at 298 indicate the source of the image stream as well as the time and date of recording. In the example illustrated in FIG. 16, sound recorded at the same time as the image is simultaneously played back via the speaker 62 (FIG. 1) and the microphone which was the source of the reproduced audio is indicated by alphanumeric characters at 300. Switch areas indicated at a lower portion 302 of the display of FIG. 16 are actuatable by a mouse-controlled cursor and emulate mechanically actuatable switches on the front panel 70 of the device housing (FIG. 2). A cursor-actuatable "pause" switch area 304 permits the user to "freeze" the image stream, thereby also halting the playback of the audio stream. The resulting paused image display is shown at FIG. 17, including an indication 306 of the paused playback mode. A pull-down menu shown at 308 in FIG. 17 permits the user to select a different audio stream to be reproduced. The mouse-controlled cursor is indicated at 310.

It should be understood that it is contemplated to provide the pull-down menu 308 of FIG. 17 also during a forward playback mode (such as that illustrated in FIG. 16) so that the user can designate a new audio stream to be reproduced to replace another stream that is currently being played back. It is also contemplated to control video and audio playback functions independently of each other, and to provide forward or backward playback of video without audio, and to forward-play audio without displaying video. In addition, it is contemplated to provide a set of interface elements like the conventional computer-display-based play, rewind, fast forward, and stop virtual keys now known in audio control functions provided in personal computers.

Figure 18:
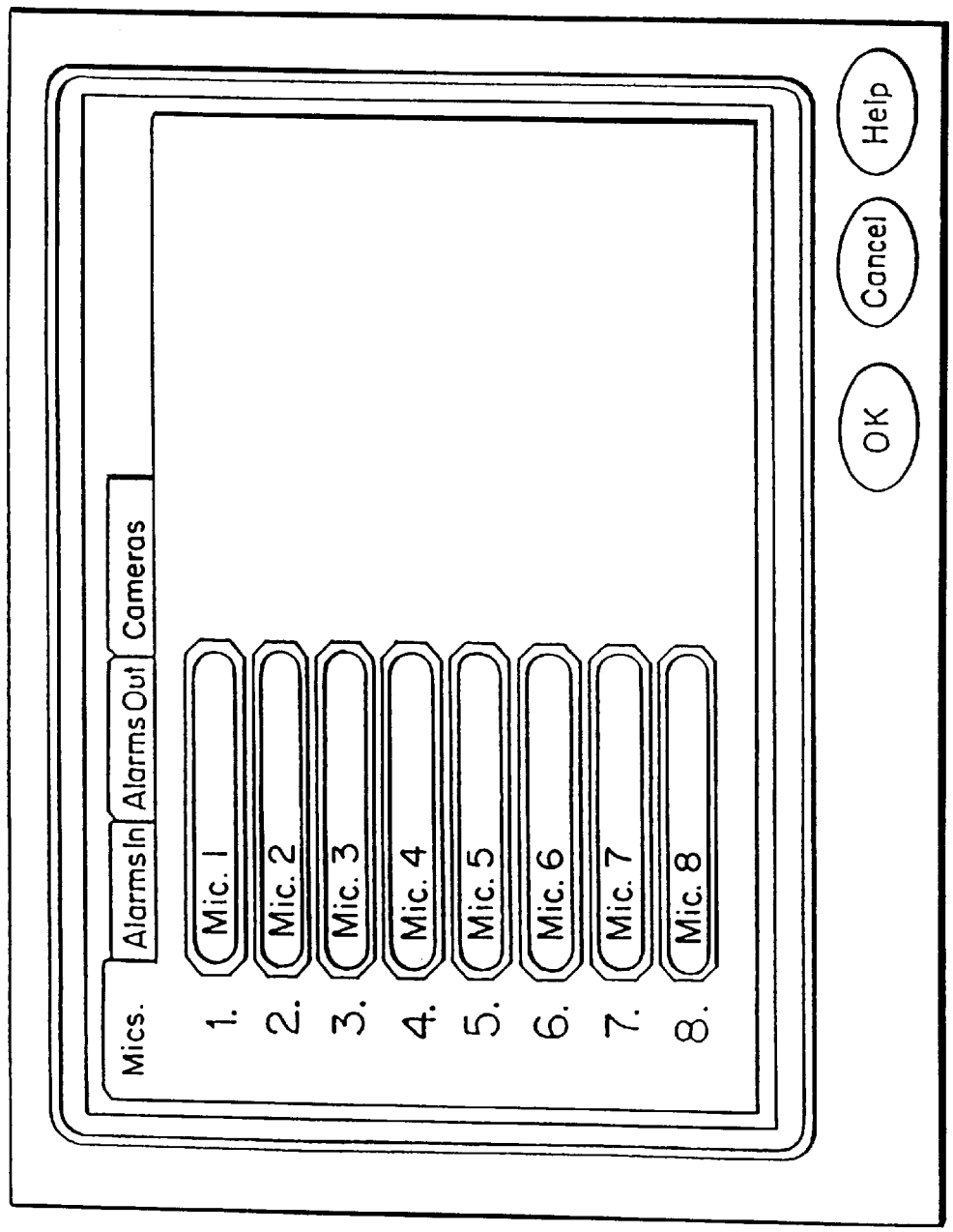
FIG. 18 is a screen display presented to a user to permit the user to assign names to microphones connected to the analysis/storage device.

FIG. 18 is a screen display which includes a dialog box for applying names to microphones which are connected as audio signal sources to the analysis/storage device. FIG. 18 includes indications that dialog boxes for naming input and output alarms and video signal sources are also available.

Figure 22:
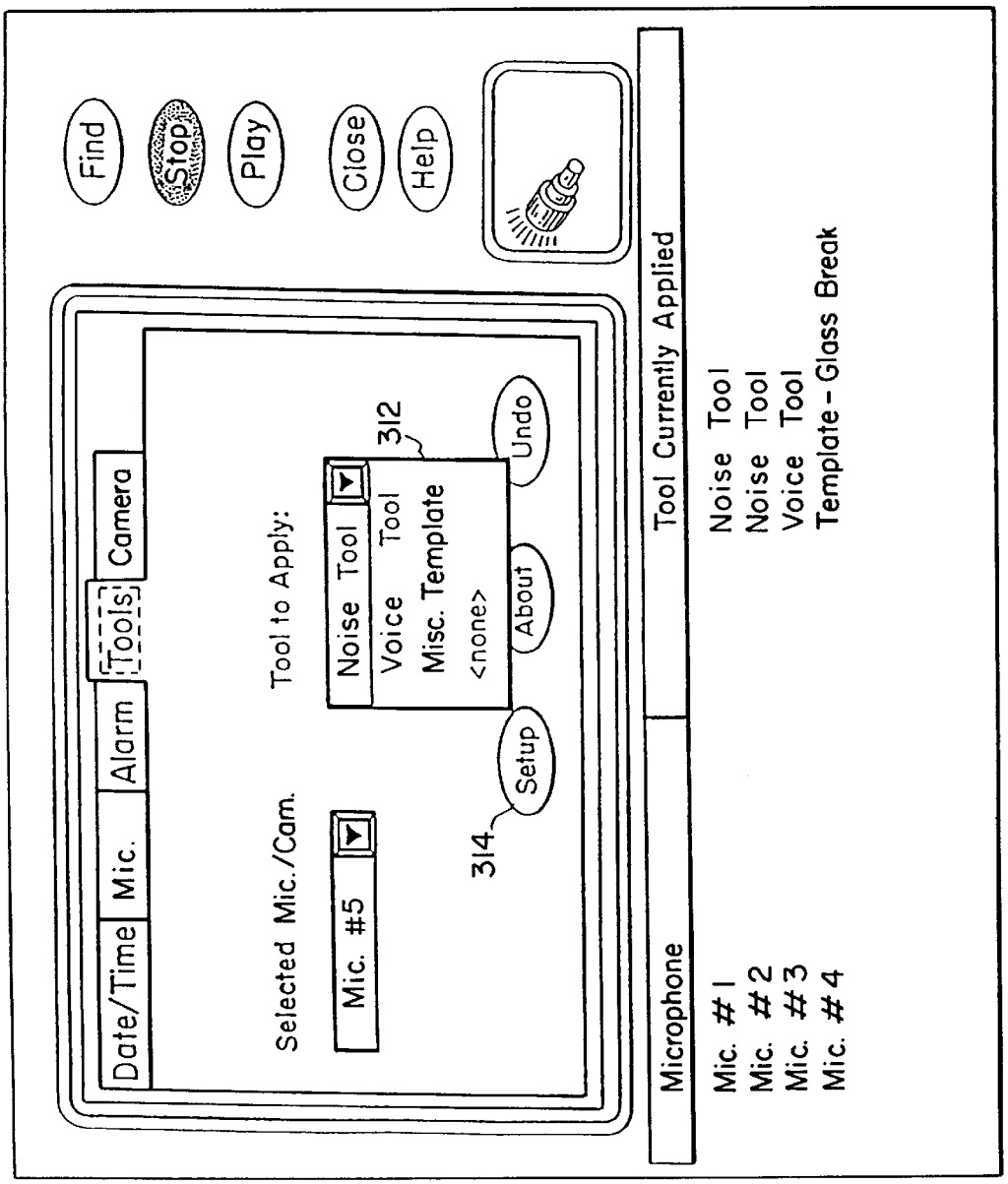
FIG. 22 is a screen display presented to the user to permit selection of an audio analysis algorithm to be used in searching the multimedia database stored in the analysis/storage device.

FIG. 22 is a screen display that is similar to the search-defining displays of FIGS. 14 and 15, except that in FIG. 22 the "tools" dialog box has been accessed. As seen at 312 in FIG. 22, a pull-down menu provides the user with several options as to selection of audio analysis tools to be used during the desired search. The tools available include the above-described "noise tool", "voice tool" and other tools using miscellaneous frequency templates. The user may also elect not to have any analysis tool applied during the search.

The screen display of FIG. 22 permits the user to conveniently select for searching purposes from among a plurality of previously-stored sound data analysis algorithms. As an alternative to the word-listing of the analysis algorithm options shown in FIG. 22, it is also contemplated to use icons representative of the previously-stored analysis algorithms available for selection by the user. Once a tool has been selected, actuation of the button area 314 calls up a setup screen, such as those shown in FIGS. 19–21.

Figure 23:
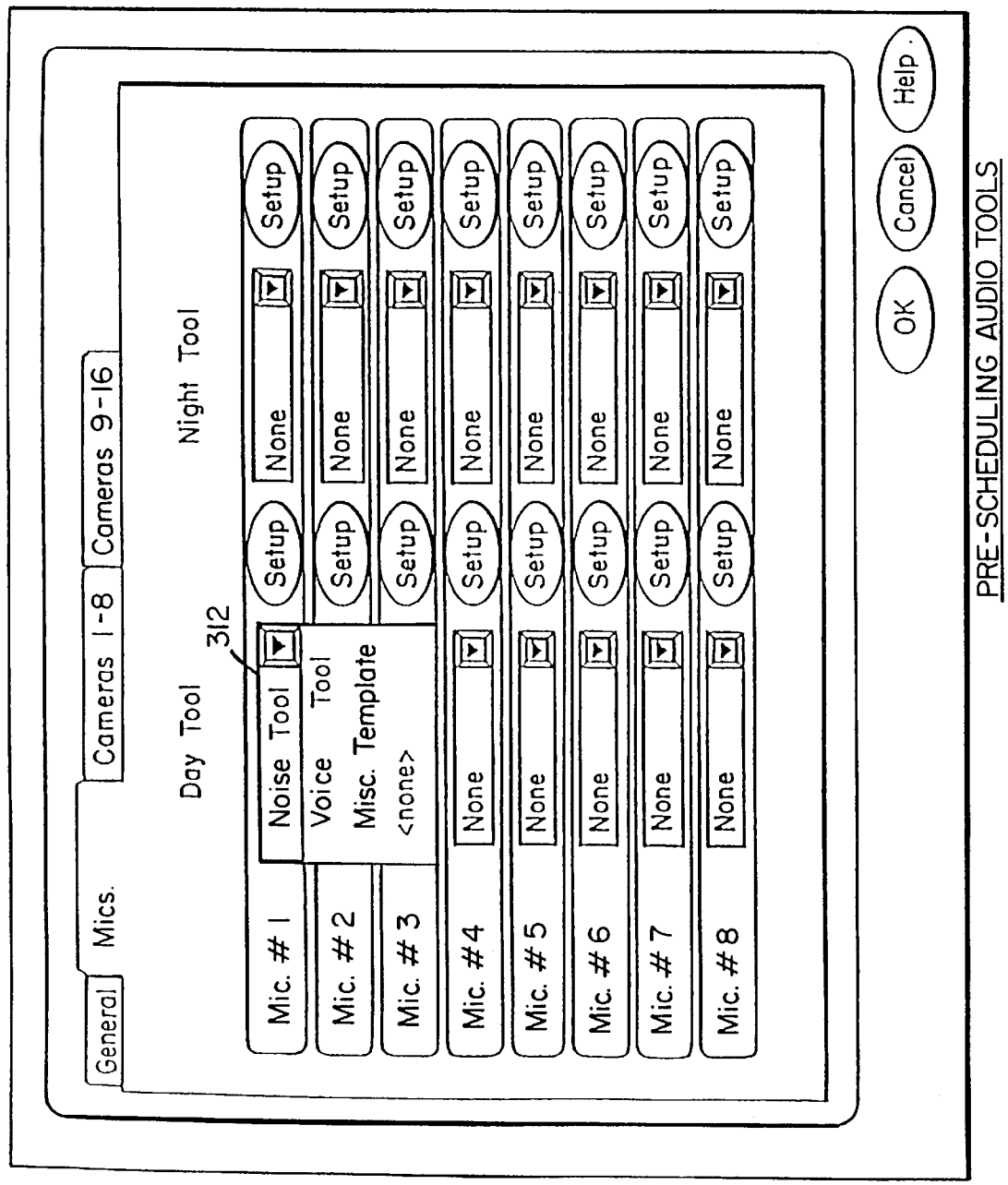
FIG. 23 is a screen display which permits the user to select, in connection with pre-scheduled operating modes of the analysis/storage device, an audio analysis algorithm to be applied to a live incoming audio signal stream.

As can be seen at 312 in FIG. 23, a tool menu can also be presented to the user to permit selection of an audio analysis algorithm to be applied to live incoming audio streams. In the screen display shown in FIG. 23, the analysis algorithms are assigned on a microphone-by-microphone basis. It is contemplated to provide even finer "granularity", by which selection of a particular analysis algorithm is applicable not only to a particular camera but also to a particular future time period.

Up to this point, the invention has been discussed in terms of managing multimedia information generated by video cameras and/or microphones provided as inputs to an analysis/storage device which applies analysis algorithms to the multimedia information. However, it is also contemplated that analysis algorithms may be applied to broadcast television signals. As the number of broadcast channels available to the consumer continues to expand, it will become increasingly advantageous to apply computer intelligence to the tasks of managing, sorting and navigating among television signal streams.

Figure 26:
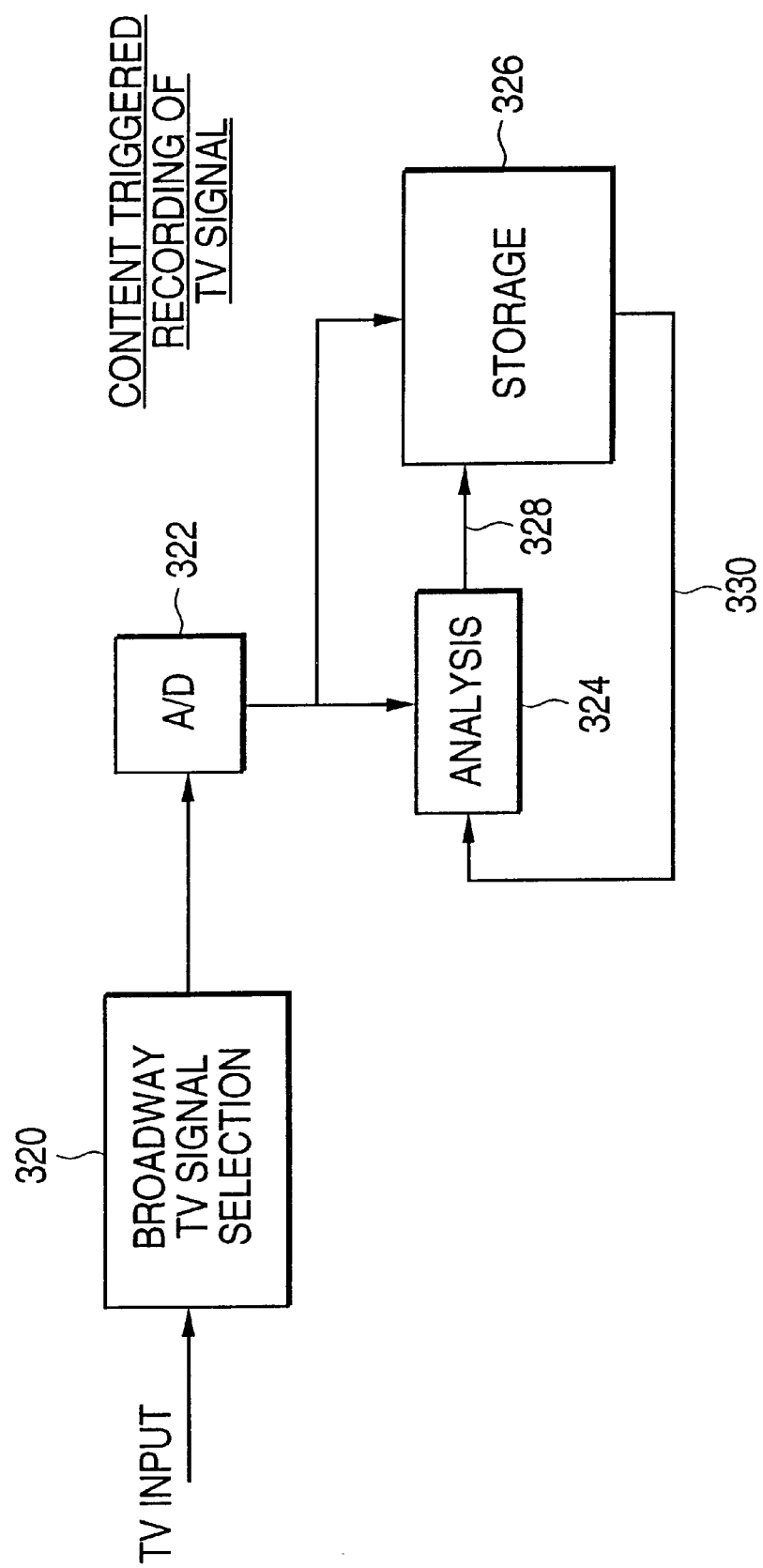
FIG. 26 is a block diagram representation of an apparatus provided according to the invention to selectively record or index television broadcast signals on the basis of content of the TV signal.

FIG. 26 shows an apparatus which applies the teachings of the present invention to management of broadcast television signals. In FIG. 26, a block 320 represents the function of selecting a broadcast television signal for analysis and/or storage. The block 320 may be a conventional device such as a television tuning circuit and/or a set-top unit utilized in known cable television systems. Alternatively, block 320 may incorporate channel-tuning circuitry of the type employed in direct satellite broadcast systems. As seen from FIG. 26, a TV signal or signals selected at block 320 are converted to digital form (if the signal is not already in digital form) at block 322 and then provided in parallel to an analysis circuit 324 and a storage device 326. The analysis circuit 324 may apply either or both of audio signal content analysis and image signal content analysis to the selected TV signal stream or streams. The results of the analysis are selectively supplied, as indicated at 328, to the storage device 326. The storage device 326 is responsive to the analysis circuit 324 either to record a selected TV signal or signals, or to associate index data with a stored TV signal indicative of the results of the analysis carried out at the analysis circuit 324. In addition to, or instead of, analysis algorithms applied to the image and audio components of the broadcast TV signal, the analysis circuit 324 may detect specific character strings in a closed-captioning component of the TV signal. In this way, the apparatus of FIG. 26 could operate as a "video clipping service" which would record television broadcast signals related to certain selected subjects, as indicated by closed-captioning content. Alternatively, as suggested above, the results of closed captioning analysis could be utilized to index particular portions of interest in a TV signal stream that has previously been selected for recording, with the indexing taking place as the signal is received. Moreover, as suggested by previous discussion, sound, image or closed-captioning analysis may be applied to a previously-recorded signal reproduced from the storage device 326 and routed to the analysis circuit 324 via a signal path 330.

An application of the invention to broadcast television signals that may be of particular interest to consumers would be a "highlight detection" feature. According to this feature, a television broadcast signal corresponding to a sporting event may be indexed or selectively recorded on the basis of an audio content analysis algorithm which detects a high level of audience or crowd noise. It may be assumed that a high level of audience reaction would correspond to a highlight such as a touchdown in football, a home run in baseball, a goal in hockey, etc. A suitable template for detecting levels of crowd noise components in the audio component of the broadcast television signal may be generated and used for comparison with the audio component of the incoming (or reproduced) television signal.

It is also contemplated to selectively record or index the television signal based on a combination of two or more of detection of an image signal characteristic, detection of an audio signal characteristic and detection of a particular character string in the closed-captioning component.

Following are additional examples of ways in which the teachings of the present invention may be applied in a number of different environments.

For the home, it may be desirable to establish an image analysis tool designed to detect the presence of a burglar. For this purpose, a stream generated from a camera positioned at a suitable location would be analyzed to detect the presence of an adult-sized object moving more slowly than a normal walking pace.

A tool intended to detect the presence of a child would use the child voice detection audio tool discussed above, in conjunction with an image analysis tool set up to detect motion of a child-sized object.

In a retail environment, image and audio analysis tools may be combined to form a cash transaction detector, which would trigger recording of a video signal to capture the transaction. The tools making up the cash transaction detector may be an audio tool which detects the presence of voices, cooperating with an image tool which detects movement characteristic of a cash transaction.

In an industrial environment, an audio tool could be established to detect malfunctioning of an item of machinery. Assuming that the machinery, when properly operating, generates a certain sound frequency spectrum, that spectrum could be established as a template for the audio tool, and significant deviation from the template could be detected to indicate a possible malfunction.

Exemplary embodiments disclosed above have included cooperative and complementary operation of audio and video analysis tools. It is also contemplated to augment audio and/or video tool-based data base searching with searches based on auxiliary data such as that provided by point-of-sale terminals, ATM's or card readers. Such searches may include searching for logical combinations of certain auxiliary data with certain audio and/or video features.

It should be understood that the embodiments of the claimed invention disclosed above are to be taken as illustrative, and not limiting. The true spirit and scope of the invention are set forth in the following claims.

What is claimed is:

1. A flexible multimedia information analysis apparatus, comprising:

(a) first storage means for storing a multimedia information data base, the data base including image data and sound data;

(b) second storage means for storing a plurality of sound data content analysis algorithms for analyzing sound data in the data base;

(c) user actuatable means for selecting one of said algorithms; and (d) analysis means, responsive to said user actuatable means, for analyzing said sound data in the data base in accordance with said one of said algorithms selected by said user actuatable means.

2. An apparatus according to claim 1, further comprising:

a plurality of microphones for generating respective sequences of analog sound signals; and means for digitizing the respective sequences of analog sound signals generated by said microphones and for supplying the digitized sequences of sound signals to said first storage means.

3. An apparatus according to claim 1, further comprising means for displaying a plurality of icons or alphanumeric labels each representing a respective one of said algorithms for analyzing sound data.

4. An apparatus according to claim 3, wherein said user actuatable means comprises means for selecting one of the displayed icons or alphanumeric labels.

5. An apparatus according to claim 4, wherein said means for selecting one of the displayed icons comprises a mouse.

6. An apparatus according to claim 1, wherein said user actuatable means includes means for setting a parameter for constraining execution of a selected one of said algorithms.

7. An apparatus according to claim 1, wherein said analysis means generates analysis data indicative of results of the analysis performed by said analysis means in accordance with said selected one of said algorithms and said first storage means includes means for storing said analysis data generated by said analysis means.

8. An apparatus according to claim 1, wherein at least one of said stored algorithms is for detecting an amplitude level of the sound data analyzed by the algorithm.

9. An apparatus according to claim 1, wherein at least one of said stored algorithms is for detecting a frequency characteristic of the sound data analyzed by the algorithm.

10. An apparatus according to claim 1, further comprising third storage means for storing a plurality of moving image content analysis algorithms for analyzing image data in the data base; said user actuatable means being operable to select one of said moving image content analysis algorithms, said analysis means being responsive to selection of one of said moving image content analysis algorithms to analyze said image data in the data base in accordance with the selected moving image content analysis algorithm.

11. A method of storing and retrieving audio data, comprising the steps of:

storing data representing sound signals generated over a period of time;

selecting a search algorithm to be used in searching for a desired sound segment represented by the stored data;

setting a parameter for constraining execution of the selected search algorithm; and searching said stored data in accordance with the elected search algorithm and the set parameter.

12. A method according to claim 11, wherein the selected search algorithm is for detecting an amplitude level of the sound signals represented by the stored data.

13. A method according to claim 12, wherein the parameter for constraining execution of the selected search algorithm represents a sound amplitude level.

14. A method according to claim 11, wherein the selected search algorithm is for detecting a frequency characteristic of the sound signals represented by the stored data.

15. A method according to claim 14, wherein the parameter for constraining execution of the selected search algorithm is for defining the frequency characteristic to be detected.

16. A flexible multimedia information analysis apparatus, comprising:
(a) an audio information source for providing audio information which represents at least one sequence of sound signals;
(b) storage means for storing a plurality of algorithms for analyzing the audio information provided by the audio information source;
(c) user actuatable means for selecting one of said algorithms; and
(d) analysis means responsive to said user actuatable means, for receiving the audio information provided by said audio information source and for analyzing the received audio information provided by the audio information source in accordance with said one of said algorithms selected by said user actuatable means.

17. An apparatus according to claim 16, wherein said audio information source includes a microphone for generating a sequence of sound signals, and conversion means for converting the sound signals to digital audio data.

18. An apparatus according to claim 17, wherein said audio information source includes a plurality of microphones which generate respective sequences of sound signals.

19. An apparatus according to claim 16, further comprising display means for displaying a plurality of icons or alphanumeric labels each representing a respective one of said algorithms for analyzing audio information.

20. An apparatus according to claim 19, wherein said user actuatable means comprises means for selecting one of the displayed icons or alphanumeric labels.

21. An apparatus according to claim 20, wherein said means for selecting one of the displayed icons comprises a mouse.

22. An apparatus according to claim 16, wherein said user actuatable means includes means for setting a parameter for constraining execution of a selected one of said algorithms.

23. An apparatus according to claim 16, wherein at least one of said stored algorithms is for detecting an amplitude level of the audio information analyzed by the algorithm.

24. An apparatus according to claim 16, wherein at least one of said stored algorithms is for detecting a frequency characteristic of the audio information analyzed by the algorithm.

25. A method of analyzing multimedia information, comprising the steps of:
(a) receiving an analog video signal which represents a dynamic sequence of images;
(b) digitizing the received analog video signal to form a sequence of video data frames which represent the dynamic sequence of images;
(c) first analyzing the sequence of video data frames using a predetermined video data analysis algorithm and generating first analysis data indicative of results of said first analyzing;
(d) storing the sequence of video data frames in a data base;
(e) storing the first analysis data in said data base in association with the stored sequence of video data frames;
simultaneously with said steps (a) to (e),
(f) receiving an analog audio signal which represents a sequence of audible sounds;
(g) digitizing the received analog audio signal to form a sequence of audio data which represents the audible sounds;
(h) second analyzing the sequence of audio data using a predetermined audio data analysis algorithm and generating second analysis data indicative of results of said second analyzing;
(i) storing the sequence of audio data in said data base; and
(j) storing the second analysis data in said data base in association with the stored sequence of audio data.

26. A method according to claim 25, wherein said second analyzing step includes detecting an amplitude level of said analog audio signal.

27. A method according to claim 25, wherein said second analyzing step includes detecting a frequency characteristic of said analog audio signal.

28. A method according to claim 25, wherein said first analyzing step includes detecting a moving object represented by said analog video signal.

29. A method according to claim 25, wherein said steps (d), (e), (i) and (j) include storing the video data frames, the audio data, the first analysis data and the second analysis data on at least one hard disk.

30. A method according to claim 29, wherein said steps (d) and (i) include storing the video data frames and the audio data together on the same hard disk.

31. A method according to claim 25, wherein said video data frames and said audio data are stored in a format which conforms to the .AVI standard.

32. An apparatus for analyzing video and audio information, comprising:
first receiving means for receiving an analog video signal which represents a dynamic sequence of images;
first A/D means, connected to said first receiving means, for digitizing the analog video signal to form a sequence of video data frames which represent the dynamic sequence of images;
first analysis means, connected to said first A/D means, for analyzing the sequence of video data frames using a predetermined video data analysis algorithm to generate first analysis data;
storage means, connected to said first A/D means and said first analysis means, for storing the sequence of video data frames formed by said first A/D means and said first analysis data generated by said first analysis means;
second receiving means for receiving an analog audio signal which represents a sequence of audible sounds;
second A/D means, connected between said second receiving means and said storage means, for digitizing the analog audio signal to form a sequence of audio data which represents the audible sounds; said storage means storing said sequence of audio data formed by said second A/D means; and
second analysis means, connected between said second A/D means and said storage means, for analyzing the sequence of audio data using a predetermined audio data analysis algorithm to generate second analysis data, said second analysis data being stored in said storage means.

33. An apparatus according to claim 32, wherein said storage means includes:

compression means for receiving the sequence of video data frames from said A/D means and for applying a compression algorithm to the sequence of video data frames to form compressed video data; and a storage medium on which said compressed video data is stored.

34. An apparatus according to claim 33, wherein said storage medium is a hard disk.

35. An apparatus according to claim 32, wherein said audio data analysis algorithm includes a process for detecting a predetermined frequency characteristic of said sequence of audible sounds.

36. An apparatus for analyzing multimedia information as said information is received, the apparatus comprising:

at least one video camera for generating a sequence of video signals;

at least one microphone for generating a sequence of audio signals;

conversion means, connected to said at least one video camera and said at least one microphone, for converting said video signals and said audio signals into video data and audio data, respectively; and analysis means, connected to said conversion means, for applying at least one video information analysis algorithm to said video data, and for applying at least one audio information analysis algorithm to said audio data.

37. An apparatus according to claim 36, wherein said analysis means includes a program memory for storing a plurality of video analysis programs each corresponding to a respective video information analysis algorithm, said program memory also storing a plurality of audio analysis programs each corresponding to a respective audio information analysis algorithm;

the apparatus further comprising selection means for permitting a user to select a one of said video analysis programs for controlling said analysis means and a one of said audio analysis programs for controlling said analysis means.

38. An apparatus according to claim 37, wherein said plurality of video information analysis algorithms corresponding to said video analysis programs include a plurality of algorithms for detecting moving objects represented by said video data.

39. An apparatus according to claim 37, wherein said plurality of audio information analysis algorithms corresponding to said audio analysis programs include a plurality of algorithms for detecting frequency characteristics of audio signals represented by said audio data.

40. An apparatus according to claim 37, wherein said selection means permits the user to set respective parameters for constraining execution of the video information analysis algorithms and the audio information analysis algorithms.

41. An audio information analysis apparatus, comprising:

means for receiving audio information;

analysis means for analyzing the received audio information in accordance with a predetermined analysis algorithm; and parameter means, actuatable by a user of the apparatus, for setting a parameter to constrain execution of said analysis algorithm, said analysis means being responsive to said parameter means so as to execute said analysis algorithm in accordance with the parameter set by said parameter means.

42. A method of searching a multimedia information data base, comprising the steps of:

storing a plurality of algorithms for identifying respective features represented by audio information in said data base;

selecting two of said stored algorithms for respectively identifying a first feature and a second feature;

selecting a logical operator to form a logical combination of said two selected algorithms; and searching said data base to identify audio data sequences which satisfy said logical combination of said two selected algorithms.

43. A method of analyzing multimedia data, the method comprising the steps of:

(a) simultaneously receiving a stream of video data and a stream of audio data;

(b) simultaneously with step (a), applying a first analysis algorithm to the received stream of video data to determine whether a first feature is present in said stream of video data;

(c) simultaneously with steps (a) and (b), applying a second analysis algorithm to the received stream of audio data to determine whether a second feature is present in said stream of audio data; and (d) if it is determined that said first feature is present in said stream of video data at a time when said second feature is determined to be present in said stream of audio data, generating an alarm signal.

44. A method of analyzing multimedia data according to claim 43, wherein:

said first analysis algorithm is for detecting motion indicative of breaking of a window; and said second analysis algorithm is for detecting a sound indicative of breaking of the window.

45. A method of analyzing multimedia data according to claim 43, wherein:

said first analysis algorithm is for detecting motion indicative of a splash in a swimming pool; and said second analysis algorithm is for detecting a sound indicative of a splash in the swimming pool.

46. A video surveillance system, comprising:

a video camera for generating a stream of video signals;

storage means, connected to said video camera, for selectively storing the stream of video signals;

a microphone for generating a stream of analog audio signals;

conversion means, connected to said microphone, for converting the stream of analog audio signals into a sequence of audio data signals; and analysis means for receiving the sequence of audio data signals and applying a selected audio information analysis algorithm to the sequence of audio data signals to detect a predetermined feature of the stream of analog audio signals;

the system being operable in a mode such that said storage means is responsive to said analysis means so as to store the stream of video signals only at times when said analysis means detects the predetermined feature of the stream of analog audio signals.

47. A video surveillance system according to claim 46, further comprising a housing in which the storage means and the analysis means are contained.

48. A video surveillance system according to claim 47, wherein said storage means includes a hard disk for storing the stream of video signals in digital form.

49. A video surveillance system according to claim 47, wherein said conversion means is contained in said housing.

50. Apparatus for analyzing audio information, comprising:

a microphone for generating a stream of analog audio signals;

conversion means, connected to said microphone, for converting the stream of analog signals into a sequence of audio data signals;

first analysis means for receiving the sequence of audio data signals formed by the conversion means and for performing a first audio information content analysis algorithm with respect to the received sequence of audio data signals; and second analysis means for receiving the sequence of audio data signals formed by the conversion means and for performing a second audio information content analysis algorithm with respect to the received sequence of audio data signals, said second audio information content analysis algorithm being different from said first audio information content analysis algorithm.

51. Apparatus according to claim 50, wherein said first analysis means detects an amplitude characteristic of the stream of analog audio signals and the second analysis means detects a frequency characteristic of the stream of analog audio signals.

52. Apparatus according to claim 50, wherein said first analysis means detects a first frequency characteristic of the stream of analog audio signals and the second analysis means detects a second frequency characteristic of the stream of analog audio signals, said second frequency characteristic being different from said first frequency characteristic.

53. Video information storage apparatus, comprising:

means for receiving a television broadcast signal, said signal including a video component and an audio component;

storage means, connected to said means for receiving, for selectively storing the received television broadcast signal in digital form; and monitoring means for analyzing content of the audio component of the television broadcast signal;

wherein said storage means is responsive to the monitoring means such that said storage means stores the television broadcast signal only when the monitoring means detects a predetermined characteristic of the audio component of the television broadcast signal.

54. Video information storage apparatus according to claim 53, wherein said means for receiving includes a tuner connected to an antenna for receiving an off-air broadcast signal.

55. Video information storage apparatus according to claim 53, wherein said means for receiving includes a set-top box connected to a cable television system.

56. Video information storage apparatus according to claim 53, wherein:

the television broadcast signal represents a sporting event; and said predetermined characteristic of the audio component of the television broadcast signal is an increase in an audience noise component of the audio component.

57. Video information storage apparatus, comprising:

means for receiving a television broadcast signal, said signal including a video component and an audio component;

storage means, connected to said means for receiving, for selectively storing the received television broadcast signal in digital form; and monitoring means for analyzing content of the audio component of the television broadcast signal;

wherein said storage means is responsive to the monitoring means such that said storage means stores the television broadcast signal only when the monitoring means detects a predetermined characteristic of the video component of the television broadcast signal.

58. Video information storage apparatus, comprising:

means for receiving a television broadcast signal, said signal including a video component, an audio component, and a closed-captioning component;

storage means, connected to said means for receiving, for selectively storing in digital form portions of said television broadcast signal; and monitoring means for detecting contents of the closed-captioning component of the television broadcast signal;

wherein said storage means is responsive to the monitoring means such that said storage means stores the television signal only when the monitoring means detects a predetermined character string in the closed-captioning component of the television broadcast signal.

59. Video information storage apparatus, comprising:

means for receiving a television broadcast signal;

storage means, connected to said means for receiving, for storing the received television broadcast signal;

monitoring means, connected to said means for receiving, for detecting contents of one of a video component of said received television broadcast signal, an audio component of said received broadcast television signal, and a closed-captioning component of said received broadcast television signal; and index means, responsive to said monitoring means, for causing said storage means to store indexing information indicative of the detected contents of the television broadcast signal.

* * * * *